United States Patent
Shimizu

(10) Patent No.: US 6,490,055 B1
(45) Date of Patent: *Dec. 3, 2002

(54) PRINTING APPARATUS WITH EXECUTION OF SOFTWARE RENDERING AND HARDWARE RENDERING

(75) Inventor: Haruo Shimizu, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/878,402

(22) Filed: Jun. 18, 1997

Related U.S. Application Data

(63) Continuation of application No. 08/343,868, filed on Nov. 17, 1994, now abandoned.

(30) Foreign Application Priority Data

Nov. 19, 1993 (JP) ............................................. 5-290928
Nov. 11, 1994 (JP) ............................................. 6-277830

(51) Int. Cl.[7] .............................................. G06K 15/00
(52) U.S. Cl. ....................................... 358/1.9; 358/1.13
(58) Field of Search ................................. 395/101, 109, 395/112; 345/418, 302, 426, 428, 427, 430, 431, 132, 150, 153, 154; 358/500, 512, 515, 517, 518, 1.1, 1.9, 1.13; 382/162, 163, 164, 165, 167

(56) References Cited

U.S. PATENT DOCUMENTS

| | | | | |
|---|---|---|---|---|
| 4,252,453 A | * | 2/1981 | Estabroous | 400/690.1 |
| 4,941,038 A | * | 7/1990 | Walowit | 358/518 |
| 4,941,108 A | | 7/1990 | Aoyagi et al. | 358/1.13 |
| 5,136,688 A | * | 8/1992 | Morikawa et al. | 358/1.16 |
| 5,157,764 A | * | 10/1992 | Phem et al. | 395/134 |
| 5,249,067 A | * | 9/1993 | Hirosawa | 358/456 |
| 5,268,995 A | * | 12/1993 | Diefendorst et al. | 395/122 |
| 5,355,443 A | * | 10/1994 | Kim et al. | 395/131 |

FOREIGN PATENT DOCUMENTS

| | | |
|---|---|---|
| EP | 0 474 153 | 3/1992 |
| EP | 0 520 818 | 12/1992 |

\* cited by examiner

Primary Examiner—Gabriel Garcia
(74) Attorney, Agent, or Firm—Fitzpatrick, Cella, Harper & Scinto

(57) ABSTRACT

A printer includes an input unit for inputting color page description information, creation means for creating intermediate information for recording by analyzing color page description information which has been input, an execution unit for executing fast hardware rendering with a hardware for the intermediate information, and a switch for switching the fast hardware rendering into a software rendering in the case of a high grade color logical drawing which cannot be supported by the hardware.

66 Claims, 22 Drawing Sheets

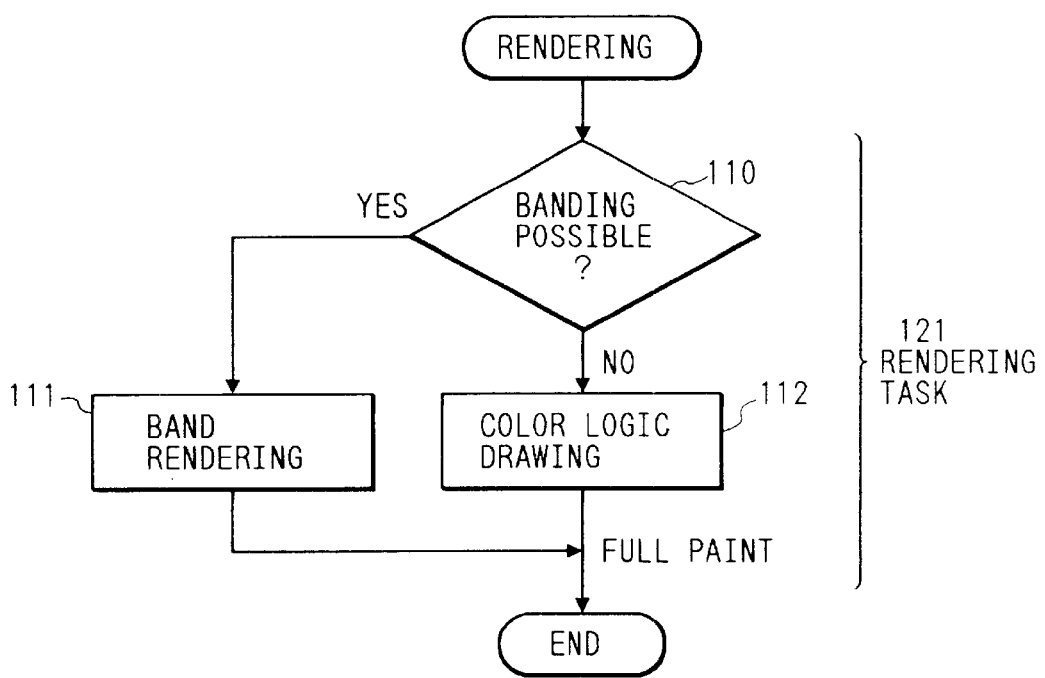

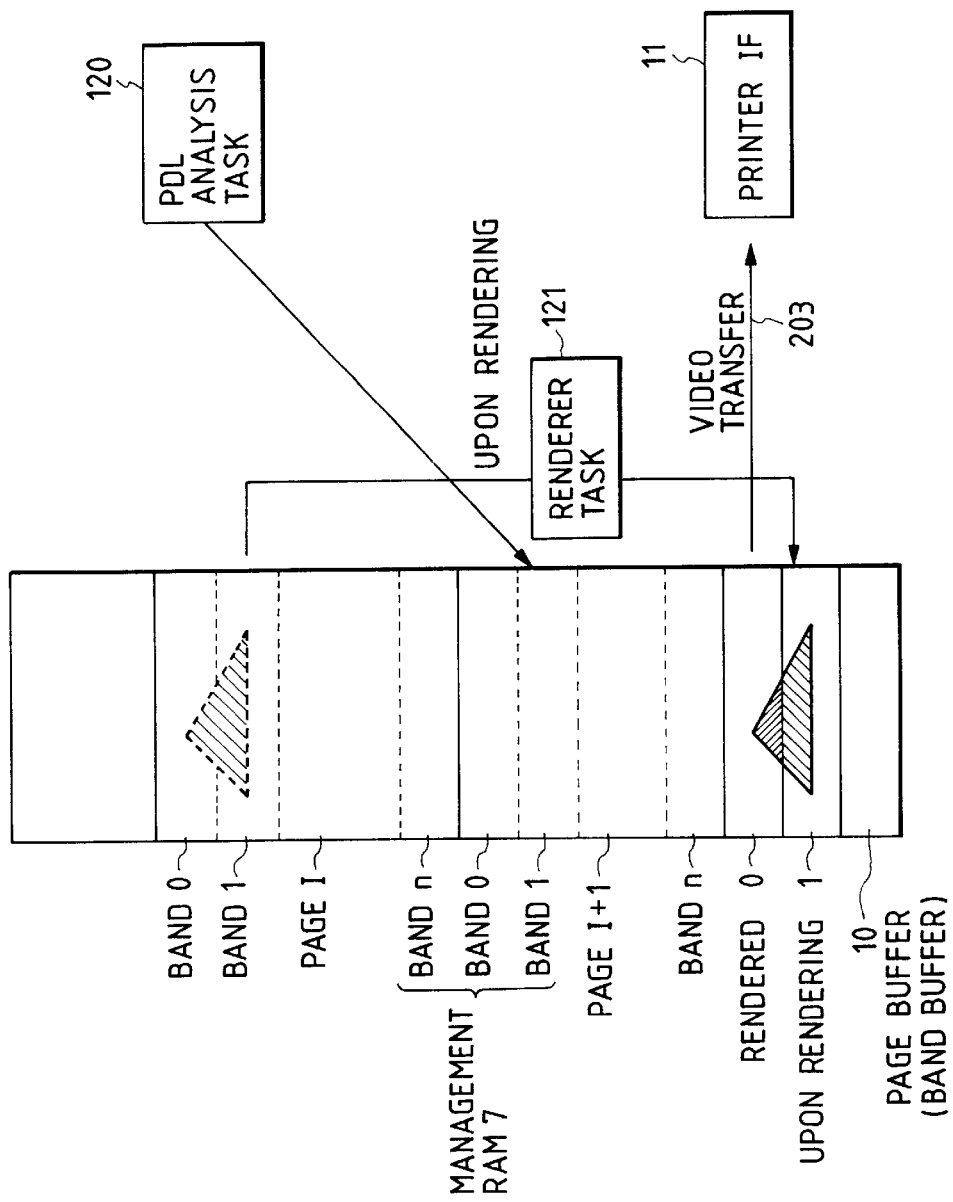

| 180 | 60 | 100 | 125 |
|---|---|---|---|
| 155 | 130 | 60 | 115 |
| 128 | 190 | 90 | 203 |
| 106 | 80 | 87 | 77 |

INPUT DATA

NOTICED PIXEL

| 74 | 53 | 32 | 80 |
|---|---|---|---|
| 23 | 5 | 11 | 58 |
| 45 | 21 | 16 | 37 |
| 65 | 43 | 64 | 85 |

DITHER MATRIX

INPUT DATA | LINE ADDRESS | COLUMN ADDRESS

| | 2 BITS | | | | | | | |
|---|---|---|---|---|---|---|---|---|
| 0 INPUT | 0,0 | 0,1 | 0,2 | 0,3 | 1;0 ---- | 3,0 | 3,1 | 3,2 | 3,3 |
| | | | | | | | | | |
| 255 INPUT | 0,0 | 0,1 | 0,2 | 0,3 | 1;0 ---- | 3,0 | 3,1 | 3,2 | 3,3 |

PRINTING APPARATUS WITH EXECUTION OF SOFTWARE RENDERING AND HARDWARE RENDERING

This application is a continuation of application Ser. No. 08/343,868 filed Nov. 17, 1994, now abandoned.

BACKGROUND OF THE INVENTION

1. Field of the Invention

The present invention relates to a color printing apparatus, and more particularly to a printing apparatus and method for printing color data useful in the multimedia processing for CAD (Computed Aided Design), CG (Computer Graphics), design, and color DTP (Desk Top Publishing) in the business, etc., at high resolution and high gradation.

2. Related Background Art

With the advent of intelligent work stations or personal computers in recent years, the environment in which the handling of characters, graphics or image data in full color is easily made has been prepared. As a result, color information has been utilized in a broad field for documents with color, OHP (Over Head Projector), slide, art, or design.

In this way, applications with color information on the host computer have been useful over the broad field. However, in recording the color information created on the host computer into the printing apparatus, it is conventionally common to rely on the utilization form of what is called a dumb printer or video printer of expanding characters, images and graphics into an image in accordance with the resolution of a recording apparatus, on the host side, using CPU power (process function) of the host computer, and then transferring the image to the color printer. This processing system has the feature of simplifying the mechanism on the printer side and performing many processes on the host side, but in handling the color information, it has a problem that it takes more time to make the communication due to a great amount of data thereof, resulting in significantly lower throughput.

On the other hand, in black-and-white printers, it is common to rely on a method, referred to as a page description language (hereinafter abbreviated as PDL) method, of creating the page image in such a way as to send characters, graphics and images as a language from the host side, interpreting the PDL language in the printer, and scan converting various types of information into a raster memory corresponding to the resolution of the printer. Color PDL printers to which this scan system is applied have recently come into wide use.

However, in the color PDL printers, a language architecture (structure) of conventional black-and-white PDL printers is followed, in which an operation such as SET, OR or XOR is performed bit by bit between the information (destination) already rendered for black-and-white or 1 bit information, and the information (source) of graphics, images and characters subsequently rendered. But in color printers, each of the color planes, e.g., RGB (red, green, blue) has a depth (e.g., 1, 2, 4, 8 bits), which is problematical in that if a conventional operation such as SET, OR or XOR is performed bit by bit, a desired color may not be obtained, whereby a logical operation function in view of the bit depth such as (Add, Sub, Max, Min, Blend), which is referred to as a color logical drawing, has been introduced.

However, the above color logical drawing had a problem in that because it was necessary to operate the information having color depth for as many as three or four planes, the processing was very costly.

Also, in the color PDL printers with the products bipolarized, that is, in the low price color printers represented by an ink jet or thermal transfer type, the page memory possesses one bit for each of four colors of YMCK, like the black-and-white printers. In making a color image or color character, or painting with color designation, the color gradation is falsely reproduced basically by dither, or an error diffusion method, to pursue the color accuracy, at the expense of resolution.

On the other hand, in high price color printers represented by a color LBP, multiple gradations/densities (e.g., 256 gradations for each color) are representable with one pixel for each of colors YMCK. In such a printing apparatus, the designated colors are directly held within the recording apparatus as the above pseudo-gradation processing is not required, and simply sent to a printer engine. However, in this recording apparatus, a page buffer for storing multi-value YMCK colors is required, wherein with a resolution of 300 DPI, a gradation of 8 bits for each color, and the maximum paper size of A4, the page memory required may be as large as 1M*4 (color)*8 (bit)=32 MB, resulting in very costly processing. Therefore, the latter can print a higher definition image, but is significantly more expensive than the former in the price of a physical printing apparatus and controller.

SUMMARY OF THE INVENTION

Thus, in the light of the above respects, it is an object of the present invention to provide a color printing apparatus which can realize a color logical drawing at lower cost and with a certain precision.

In the light of the aforementioned drawbacks with the state-of-the-art color recording apparatus, it is another object of the invention to reduce the use amount of memory by performing color image expansion at a high rate through a banding process, without the use of a full multi-value bit map memory, in a color printer with the capability of multi-value color reproduction.

However, when there is too large an amount of print data sent from the host apparatus side to permit image expansion in real time, or a hard accelerator is disenabled for the printing, the degrade process is performed by lowering the gradation (from 8 bits to 2 bits) and with a full-bit map. In doing so, with the same calculation as above, the memory capacity is equal to 1M*4 (color)*2 (bit)=8 MB.

Here, comparing both processing methods with respect to the color reproducibility, the number of reproducible colors is:

$$\text{banding method} \rightarrow 2^{8^4} = 4.2 \times 10^9$$
$$\text{degrade method} \rightarrow 2^{2^4} = 256$$

In comparison, with the banding method, sufficient color gradation can be realized with the designated colors by the user, whereas with the degrade method, which can represent only 256 gradations, there is a great possibility that sufficient gradation may not be represented, whereby a pseudo-gradation process such as a dither or error diffusion method is performed in attaching importance to the gradation.

To accomplish the above objects, the present invention is characterized by comprising input means for inputting color page description information, creation means for creating intermediate information for recording by analyzing said color page description information which has been input, execution means for executing fast hardware rendering with a hardware for said intermediate information, and switch means for switching said fast hardware rendering into a software rendering in the case of a high grade color logical drawing which cannot be supported by said hardware.

To accomplish the above objects, the invention is characterized by comprising input means for inputting color page description information, creation means for creating intermediate information for recording by analyzing said color page description information which has been input, judgement means for judging whether or not banding process is executable to said intermediate information created, and control means for controlling the band rendering to be executed without lowering the color gradation when the banding process is judged to be executable by said judgement means, or the degrade rendering to be executed by lowering the color gradation when the banding process is judged to be inexecutable.

BRIEF DESCRIPTION OF THE DRAWINGS

FIG. 6 is a flowchart showing the overview of an overall rendering process in one embodiment of the invention.

FIG. 7 is a view showing the concept of band rendering in one embodiment of the invention.

DESCRIPTION OF THE PREFERRED EMBODIMENTS

The embodiments of the present invention will be described below in more detail with reference to the drawings.

Figure 1:
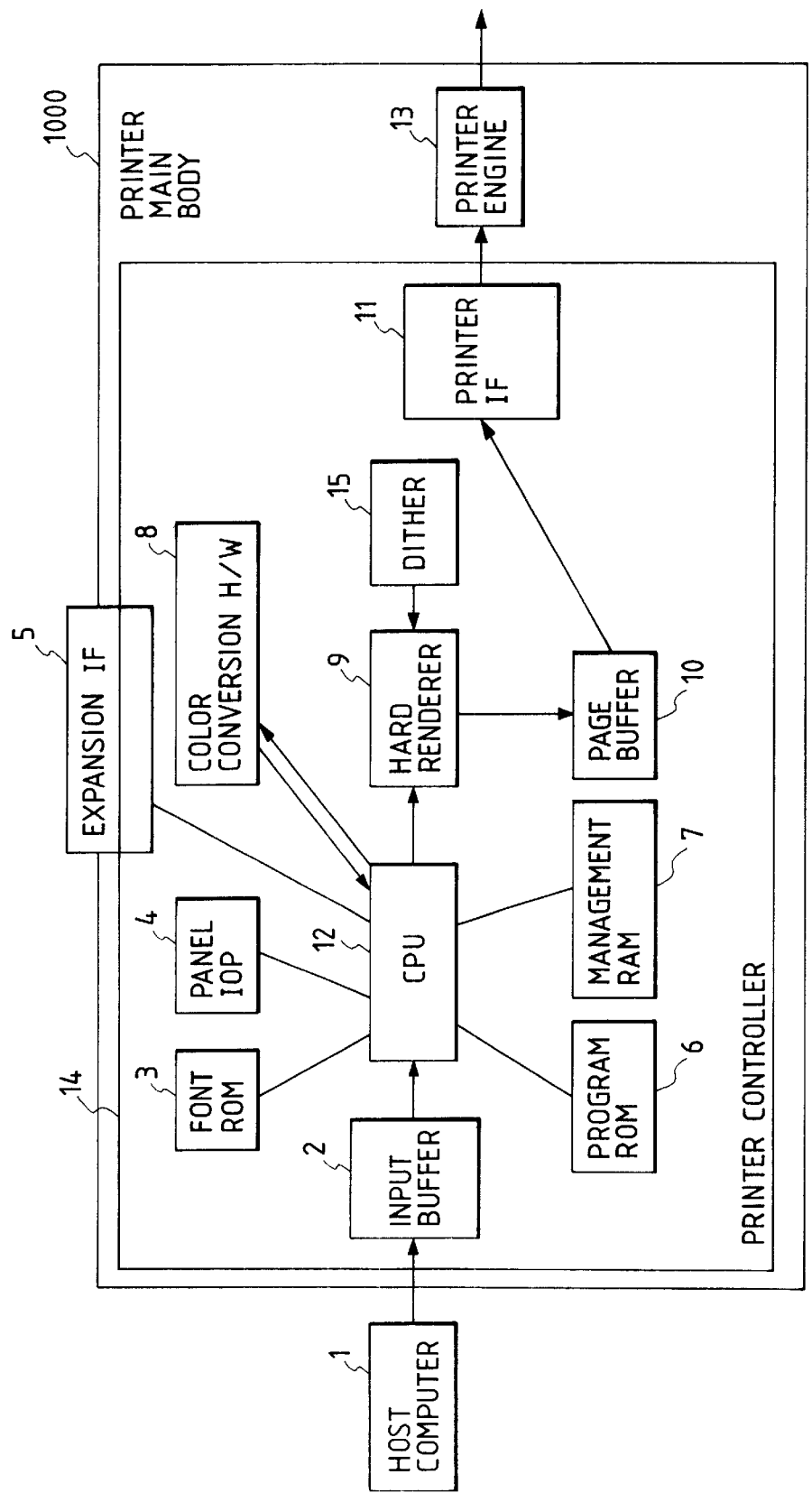
FIG. 1 is a block configuration diagram showing the fundamental configuration of a color printing apparatus 1000 according to one embodiment of the invention.

FIG. 1 shows a basic configuration of an image processing system in a color printing apparatus 1000 according to one embodiment of the invention. Referring now to FIG. 1, an overall flow of the processing will be described.
(Overall Configuration)

In FIG. 1, 1 is a host computer (work station) for creating color information as the color application, converting color data corresponding to this color information into PDL form, and sending converted PDL data to a recording apparatus controller 14 of the color printing apparatus 1000. Herein, PDL data flows between the host computer 1 and the recording apparatus 14. The communication form of this PDL data may be any of a serial, network or bus connection, but desirably is a high speed communication path in view of performance. The color PDL data sent to the recording apparatus controller 14 is temporarily stored in an input buffer (data input buffer) 2, input data being scanned by a PDL command analysis program within a program ROM. 3 is a font ROM for storing character bit patterns or outline information, and character base line or character metric information, and usable in printing the character. A panel IOP (input/output processor) designated by 4 is an I/O processor and firmware (panel I/O processor) for governing the detection of a switch input on the panel attached on the printer main body, as well as the display on LCD (liquid crystal display), for which an inexpensive CPU is used. An extension I/F (interface) 5 is an interface circuit with an extension module of printer (font ROM, program ROM, RAM, hardware).

Figure 2:
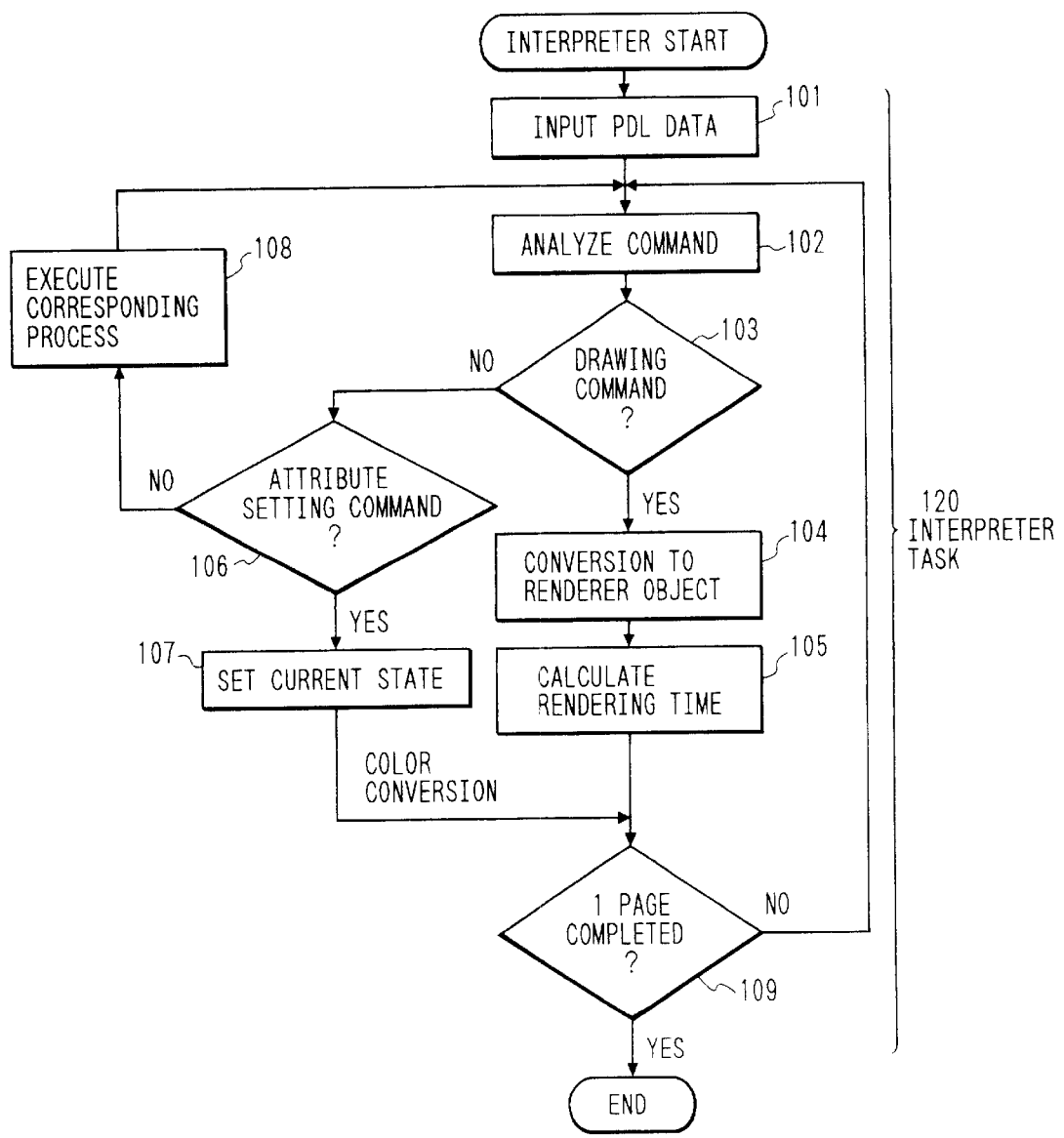
FIG. 2 is a flowchart showing the overview of an interpreter processing according to one embodiment of the invention.

A program ROM 6 is a memory for storing processing procedures (software) according to the invention as shown in FIG. 2, a CPU 12 performing the reading of color PDL data in accordance with the software. 7 is a RAM for management area for the software, in which is stored data obtained by analyzing and converting input color PDL data into intermediate data form (page object) or global information.

A color conversion hardware 8 is a hardware for conversion from RGB (additive primaries method) of red, green and blue of a monitor color specification system normally used in the work station (WS) into YMCK (subtractive primaries method) of yellow, magenta, cyan and black for use in the ink processing of the printer. This color conversion processing, which requires a great amount of operation power in non-linear log conversions and 3×3 matrix operations in pursuing the color accuracy, is speeded up in hardware through a table look-up process. The parameters of this color conversion are first adjusted to be optimal for the printer engine, but if there is a request for altering the color conversion system from the host side, the color conversion algorithm can be changed to that as defined by the user by altering the values of the table. Also, it is possible to make the software operation by the CPU 12 at the expense of the processing time.

A hard renderer (hardware rendering circuit) 9 performs the rendering process in real time synchronously with the video transfer of the printer engine 13 of a color printer (e.g., laser beam printer) by performing a color rendering process with ASIC (Application Specific IC) hardware, thereby implementing the banding process with smaller memory capacity. A page (band) buffer 10 is an area for storing the image expanded by the PDL language, for which it is necessary to reserve a memory of 2 bands at minimum (page width*256 or band height of about 512*3 (RGB) or 4 (YMCK) as the number of planes*bit depth) to permit the above banding process, or a full-color bit map memory with lower resolution and/or color gradation in the apparatus requiring the image to be transferred synchronously with the printer engine, such as an LBP (laser beam printer), when the banding process is disenabled. However, in a system such as an ink jet printer where the movement of the recording head is controllable on the controller side, the memory of 2 bands at minimum may be only needed.

A dither pattern 15 is unnecessary in printing at high speed with less memory capacity by banding, but in the degrade process (too much print data being present in a certain band to permit image expansion in real time, or overflow of page object from the management RAM 7 to make compulsory printing halfway of one page), it is used to reproduce the color accuracy with less bit depth.

A printer interface (I/F) 11 is useful to transfer video information in the content of the page buffer 10, synchronously with a horizontal/vertical synchronizing signal of the printer, to a color printer (color printing apparatus) 13, e.g., a color LBP. The printer interface is also useful to make the head control in the color ink jet printer or the transfer of video information in accordance with the head size of multiple lines. Further, this printer interface 11 is useful to make the transmission of a command or the reception of status to or from the color printer 13. A CPU (Central Processing Unit) 12 is a processing unit for controlling the processing inside the recording apparatus controller 14. The color printer 13 performs the color printing of a video signal sent from the controller 14 on the recording medium. The color printer 13 may be a color LBP of electrophotographic system or a printer of ink jet system.

Figure 3:
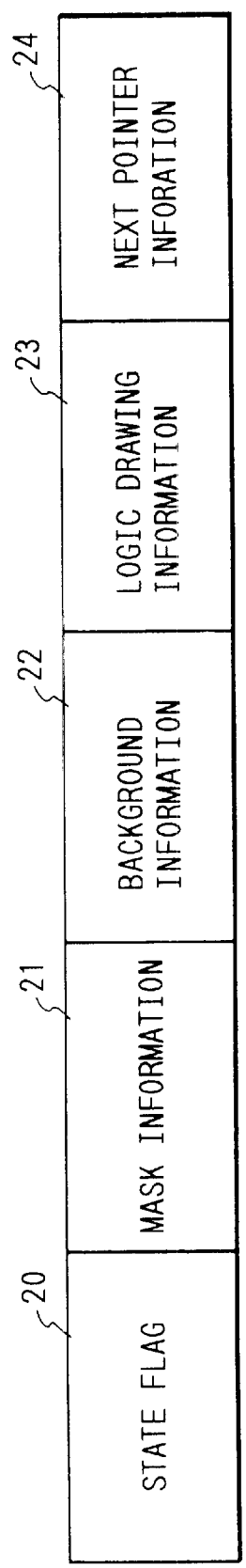
FIG. 3 is a view showing a format of intermediate data.
Figure 4:
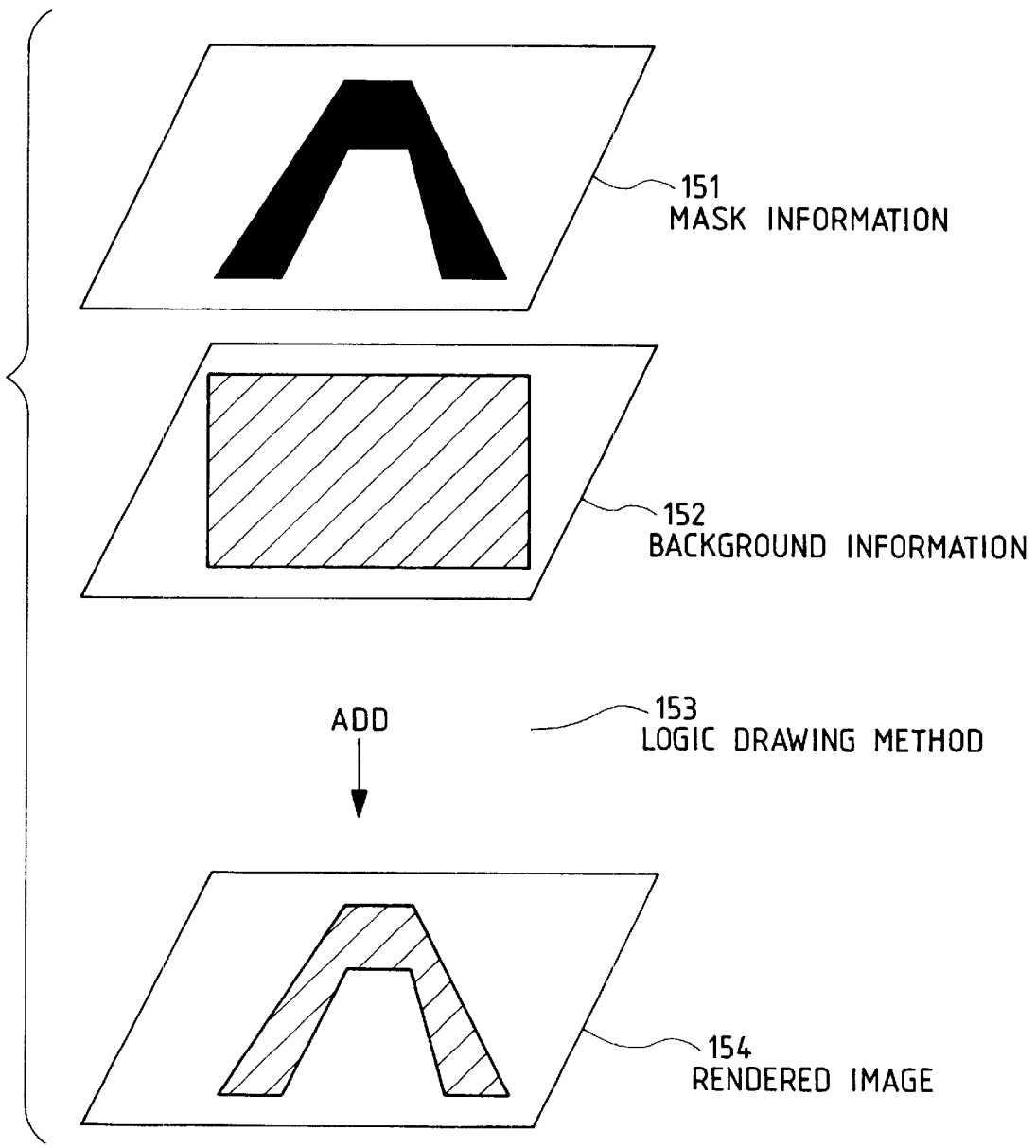
FIG. 4 is a configuration diagram showing an imaging model according to one embodiment of the invention.

Next, an interpreter processing (data, filtering, task) of this embodiment will be described below, using a flowchart of interpreter processing as shown in FIG. 2, the intermediate data format as shown in FIG. 3, a rendering model as shown in FIG. 4, and an explanatory view relating to various kinds of mask information as shown in FIGS. 5A to 5D.

The arrow in FIG. 1, indicates the flow of processing with various kinds of drawing information from the host computer 1 to the printer engine 13. Note that the program as shown in the flowchart of FIG. 2 is stored in the program ROM 6 and executed by the CPU 12.

First, at step 101, the CPU 12 gets color PDL data into the input buffer 2 with an interrupt processing. At step 102, an input PDL command is interpreted in accordance with the language specification. As a result of the interpretation, if the input data is a drawing command, e.g., character, straight line or image drawing, at step 103, the intermediate data of intermediate data format as shown in FIG. 3 is created and stored in the management RAM 7 at step 104. This intermediate data is passed through rendering process as will be described later and stored in the page buffer 10 as the bit map data.

FIG. 3 is a format in storing intermediate data created as a result of interpreting PDL data into the management RAM 7, in which after such information of one page is stored, the rendering process is executed for each of R, G and B planes via a paper exhausting instruction (i.e., Form Feed) to create a color image.

In the figure, 20 stores a flag (0) indicating the execution of soft rendering, or a flag (1) indicating the execution of hard rendering, for example, as will be described later. 21 stores mask information 151, 22 stores background information 152, and 23 stores a logical drawing system 153, as will be described later. Furthermore, 24 stores next pointer information 154 for the transfer to the next intermediate data.

For easy understanding of the following explanation, a rendering model of this embodiment will be simply described, using FIG. 4. This model is composed of geometric information of various kinds of drawing data, that is, three components of the mask information 151 representable with 1 bit of ON or OFF concerning what section is subjected to drawing, the background information 152 of color multi-value concerning what color is used to paint the mask, and the logical drawing system 153 (SET, OR, XOR, BLEND, ADD, etc.). In making a clip in arbitrary shape, the clip is first applied on the shape data (mask information), and only the remaining area after clip is masked. A resulting image from the rendering is shown at 154. Then, handling the color multi-value background information 152 is determined.

Figure 5A:
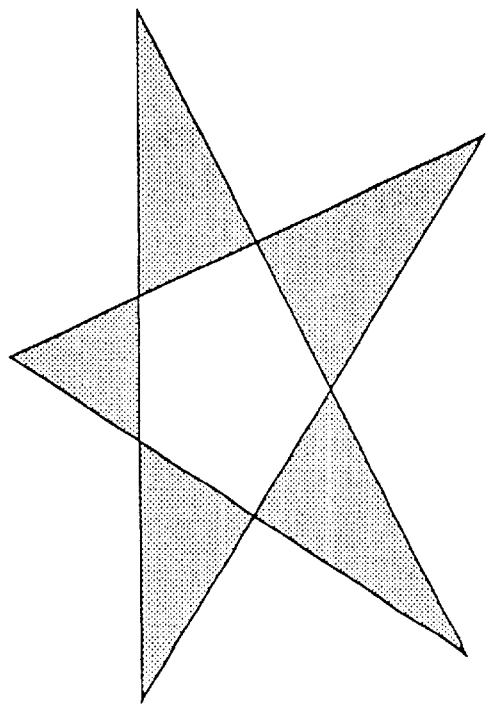
FIGS. 5A to 5D are explanatory views relating to various kinds of mask information in one embodiment of the invention.
Figure 5B:
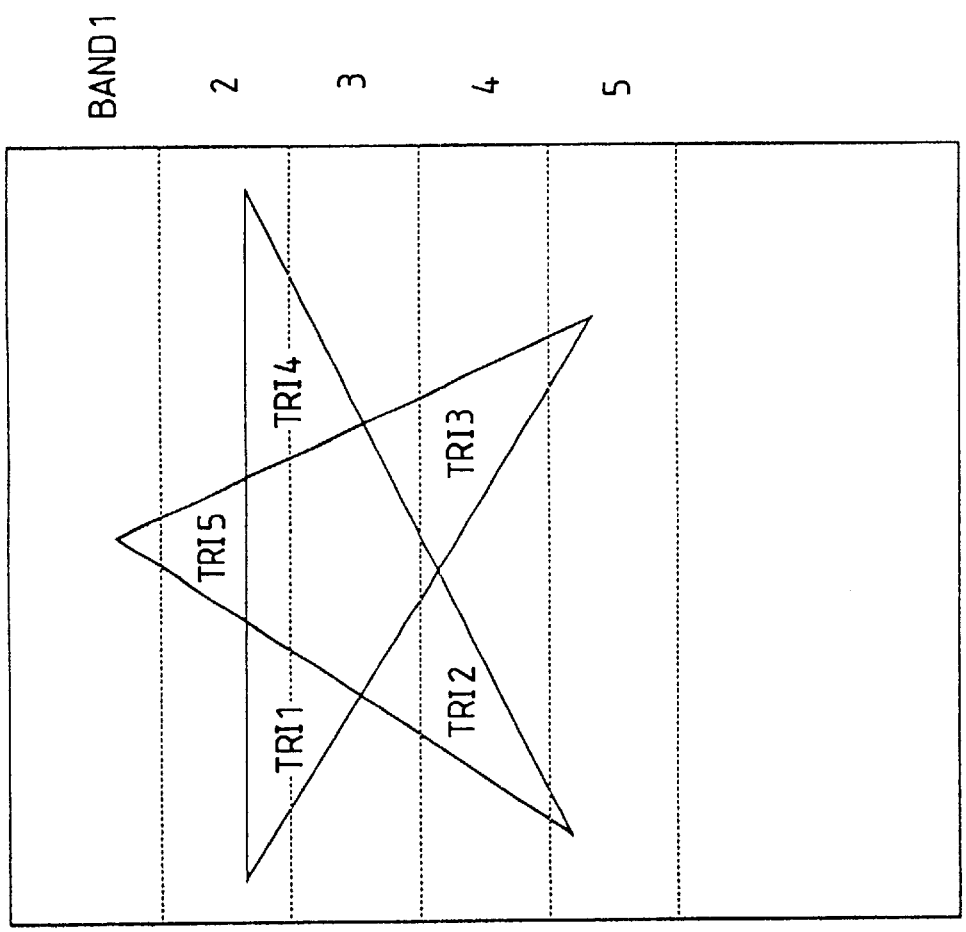

In this embodiment, the mask information 151 to be supported is composed of run length (one scan line in the X direction), convex polygon with no edge crossed, bit map image, and bit map font. As can be seen from such information, the mask information is made a suitable structure for the fast hardware rendering, for example, a pentagon of FIGS. 5A to 5D is subdivided into five triangles not crossed, as shown in FIG. 5B, at step 104 (the painting is in accordance with an even-odd rule in this embodiment). In a line connection processing portion as shown in FIG. 5C, by applying a DDA algorithm in this module, information is expanded into a work area within the management RAM 7 in view of the line connection information (round, miter, triangle), and the final external shape is held in the run length manner for each Y scan line, with min x and max x as pair information, to prepare for the fast rendering to be subsequently performed.

Figure 5D:
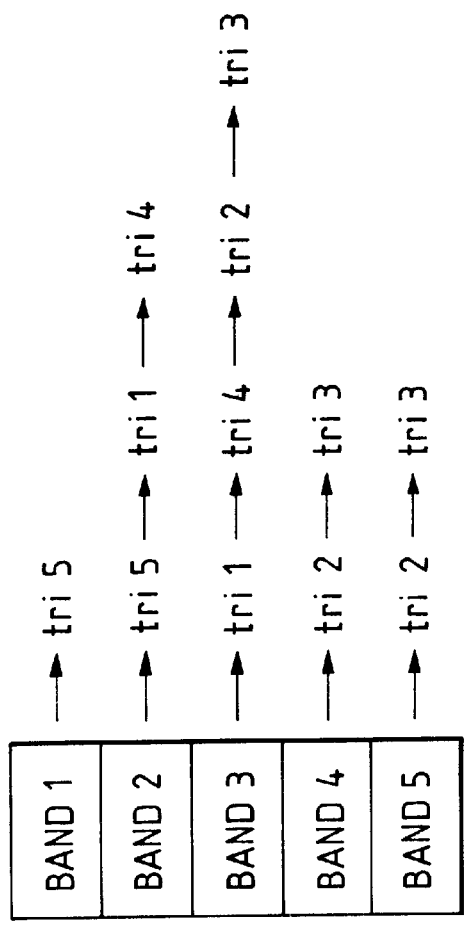
Figure 5C:
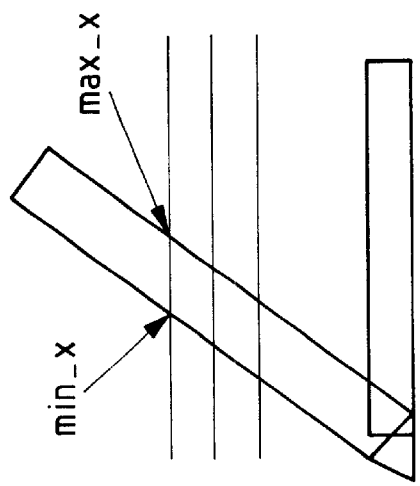

Each mask object finally created is made by subdividing a page memory for the rendering with smaller memory capacity than the full page memory, i.e., banding, into multiple bands (desirably a power of 2 in height, and optimally about 512 dots), sorting each mask object for each band, and making up a link list as shown in FIG. 5D within each band. In doing so, regarding the mask information (e.g., a polygon as shown in FIG. 5B) lying over the bands, polygonal information is shared between each band. At step 105, the decode time and rendering time of data required in rendering is added to the mask subdivided into the bands every time page object is created in each band. This information is held for each band i and defined as pred_decode (i) and pred_render (i). The decode time is substantially proportional to the data amount of created object. However, the decode time for triangles 1, 4 in a band 3 (see FIG. 5B) needs an excess time for obtaining the offset from the start point of previous band 2 to the start point of polygon at the band 3.

The rendering time is calculated by the expression:

mask area within band×color depth of background× number of color planes×operational factor with the kind of logical drawing.

Turning back to FIG. 2, when the input data is not a drawing command, a check is made to see whether or not data is a setting command for various attributes (background, logical drawing) at step 106. If YES, a corresponding processing is performed for the conversion into data form (page object) readable by the hard (or soft) renderer at step 107.

As in this embodiment, since the function of color logical drawing is not supported by the hardware, a full paint flag (full-p-lag) is set at step 107 if such attribute setting command information is detected. As a result, the rendering in a full paint mode as will be described later is performed with the resolution and/or gradation of printing compulsorily lowered.

Similarly, an instruction such as Flood Fill (painting with point designation) is not executable to the rendering with the banding, whereby the full paint flag is set if such information is detected. Consequently, the rendering occurs in the full paint (degrade) mode with the resolution and/or gradation of printing compulsorily lowered.

The background information 152 represents what colors or densities are attached to the mask. Two kinds of background are designable, including a background pattern which is attached to the mask without repeated image, and a tile pattern which is attached to the mask by repeating the pattern in vertical and horizontal directions. In this embodiment, because the color printing apparatus is supposed, the image and tile can be designated as the color information.

At step 108, the current state is dumped for the purposes of, for example, debugging. At step 109, a check is made to see whether or not the processing of the interpreter 120 has ended the PDL command analysis of one page. If yes, the processing transfers to the renderer task as will be described later, but if not, the next command analysis is performed at step 102.

The above processing is basically a data filing task from the PDL to the page object, and the subsequent processing is a rendering task for drawing onto the page buffer 10. These both tasks are packaged separately on a real time OS, because the real time processing is required especially in the rendering task, and the latter rendering task operates with the setting of higher priority than the former.

Referring now to a flowchart as shown in FIG. 6, the rendering process (rendering task) will be described below. Note that the program as shown in the flowchart of FIG. 6 is stored in the program ROM 6 and executed by the CPU 12.

At step 109 of FIG. 2, if the CPU 12 determines that the PDL command analysis of one page is ended, this program is initiated. At step 110, a check is made to see whether or not the band rendering (banding) process is permissible as a pre-processing for rendering the page object. The instances of not permitting this banding process are cited in the following.

Flood Fill instruction present in one page.

Overflow of information from management RAM 7 due to too large quantity of image input (memory degrade)

If a color printer 13 like an electrophotographic LBP, LED (light emitting diode) printer starts the recording on a paper once supplied, it is necessary that the banding process carries out in parallel the transfer of video signal to the printer 13 and the rendering to the band, whereupon the rendering time pred_decode (i), pred_render (i) for each band which are calculated at step 105 in FIG. 2 exceeds a predetermined threshold in some band (time degrade).

Since the banding cannot be carried out if any of the above conditions is met, a full paint memory is reserved in the memory of the page buffer 10 with lower resolution or gradation at step 1122 to execute the rendering as hereinafter described (color logical drawing). On the other hand, in the apparatuses of the form in which the movement of the recording head is controllable on the controller side, such as an ink jet printer, the rendering time (third condition) is not restricted as above described, but with the lower rendering speed, the movement of the head is slowed to permit the banding process.

Note that if the above conditions are not met at step 110, the band rendering is performed at step 111.

Figure 8:
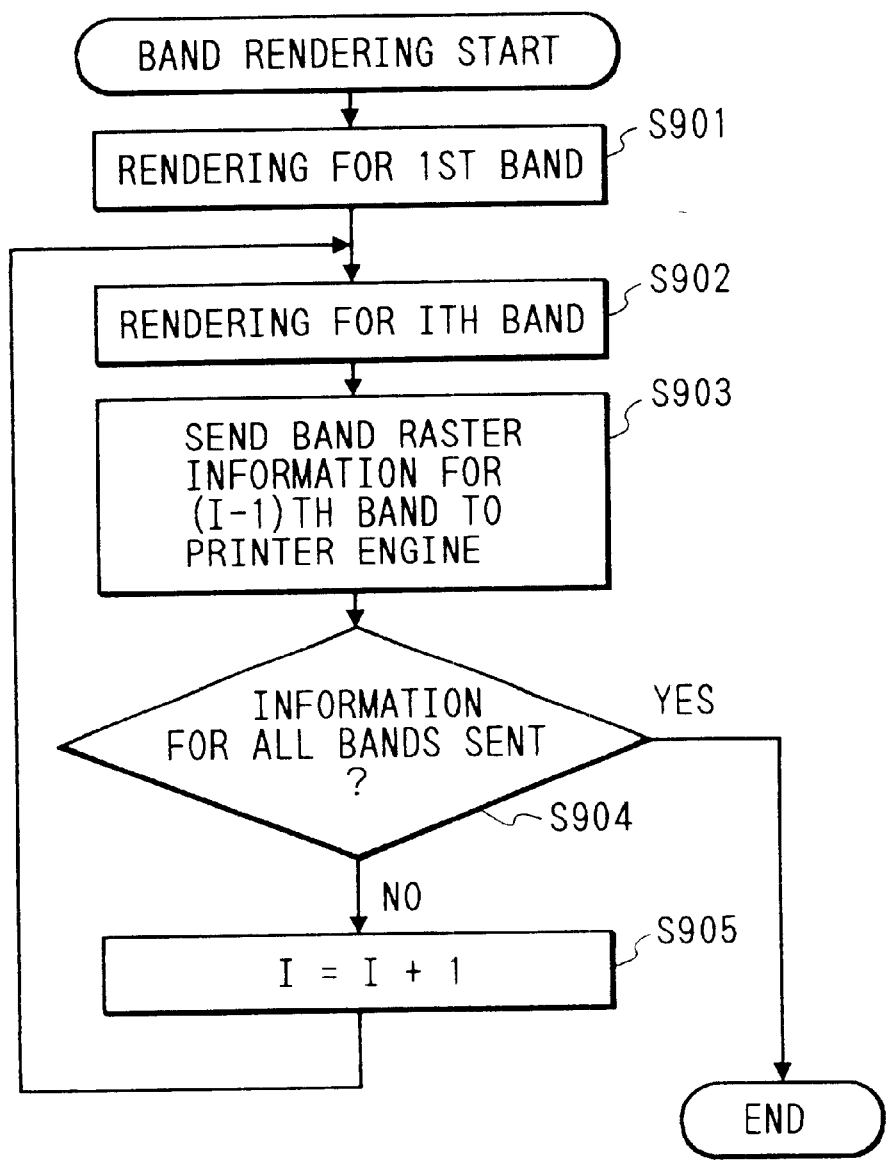
FIG. 8 is a flowchart showing the overview of band rendering process in one embodiment of the invention.

The band rendering process at step 111 as above will be described below using a view showing the concept of band rendering as shown in FIG. 7 and a flowchart of band rendering process of FIG. 8.

At step 901, the CPU 12 extracts scan line information (x min, x max) in the Y coordinate from the mask information of intermediate data created in the management RAM 7 through the PDL analysis task 120, and writes corresponding background information into a band raster memory 10 by referring to the current background information and logical drawing mode.

Next, the next point information 154 as shown in FIG. 3 is followed to correspond to all the mask in the same band to execute the rendering until the link is terminated (step 902).

In FIG. 7, data of each band exists in a continuous memory space, but in practice each intermediate data may exist in any memory, the information within the band being of the list structure. Also, the page number during page analysis is not necessarily the same as the page number during rendering, but typically, the relation of the page during page analysis≧page during rendering is true.

The hard renderer 9 performs the rendering for page object of page number i in accordance with the mask information 151, the background information 152, the logical drawing method 153, and in parallel sends band raster information (bit map data) of page number i−1 already rendered through the printer I/F 11 into the printer engine 13, as the video signal, synchronously with a horizontal synchronizing signal sent from the printer engine 13 (step 903).

The printing is performed by executing this process for all bands (step 904).

In this embodiment, the rendering process in real time is implemented by providing two bands as the band raster information, which bands are switched during rendering (N+1-th band) and during transfer to the engine (N-th band) within a predetermined time. If the band height can be increased, the occurrence frequency can be lowered in the aspect of time degrade against the local concentration of objects.

Note that since the color printer is supposed in this system, four planes for the page buffer 10, namely, planes for YMCK, exist to perform the rendering of color information for every plane.

There are provided three types of logical drawing which can be supported by the hard renderer as follows, with source pattern (S) and destination pattern (D). They support none of the processings requiring the operational power, such as a processing of inputting information for both patterns S and D, operating between both, and setting on the pattern D. This is caused by the fact that four planes of color are necessary to refer to, and further, the operation amount of data becomes significantly large when each plane consists of 4 to 8 bits. Accordingly, when the PDL data corresponds to any of the following three types, the state flag of FIG. 3 is set to 1, or when the PDL data requires the operational power, the state flag of FIG. 3 is set to 0 (soft rendering).

Overwriting (D=S)

Transparent, not drawn in D (D=D)

White (D=0)

Normally, supposing that the high grade color logical drawing data is not frequently sent from the host computer, in order to make the data processing supportable by this hardware as fast as possible, or as the color model of printer is YMCK, the color information provided for the background is made YMCK. At step 107 of FIG. 2, when the background information is analyzed and data is stored in the management RAM, RGB data sent from the host is converted into the YMCK color, using a color conversion hardware 8, and held as the background information. The color conversion may be implemented with the software, rather than the hardware, but is desirably implemented with the hardware in view of the fast processing.

In this way, the hardware performs the rendering for page object of band number i in accordance with the mask information, the background information and the logical drawing method, and in parallel sends the band information of band number i−1 already rendered through the printer interface 11 into the printer 13, as the color video signal (YMCK), synchronously with a horizontal synchronizing signal sent from the printer 13. In this band processing, page data consisting of three color logical drawings as above cited can be printed at sufficiently high speed. Since the page description language P which is broadly used nowadays conforms with the simple color drawing logic, a quantity of data can be subjected to rendering at high speed through this banding process.

Figure 9:
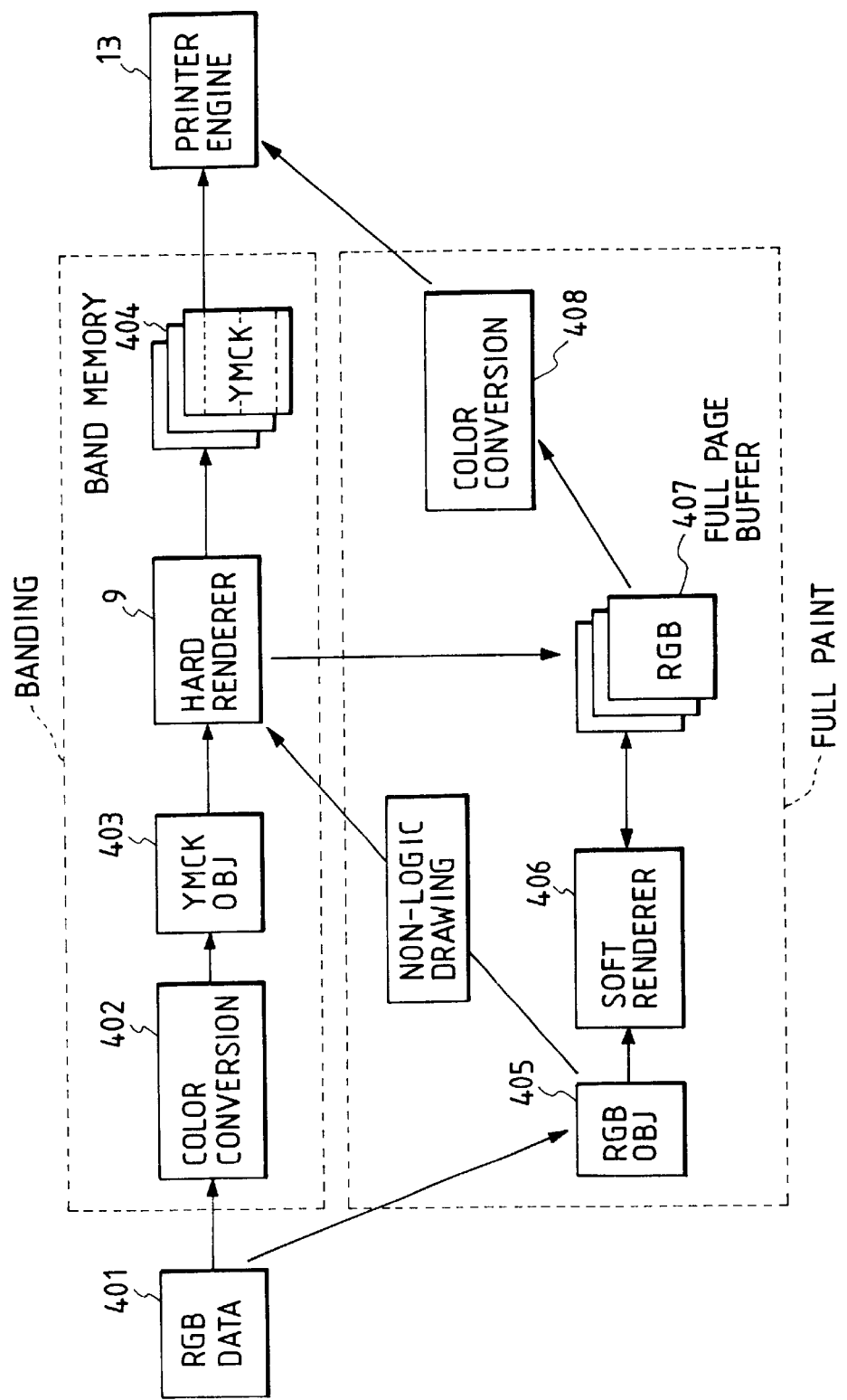
FIG. 9 is a block configuration diagram relating to color processing in the logical drawing in one embodiment of the invention.
Figure 10:
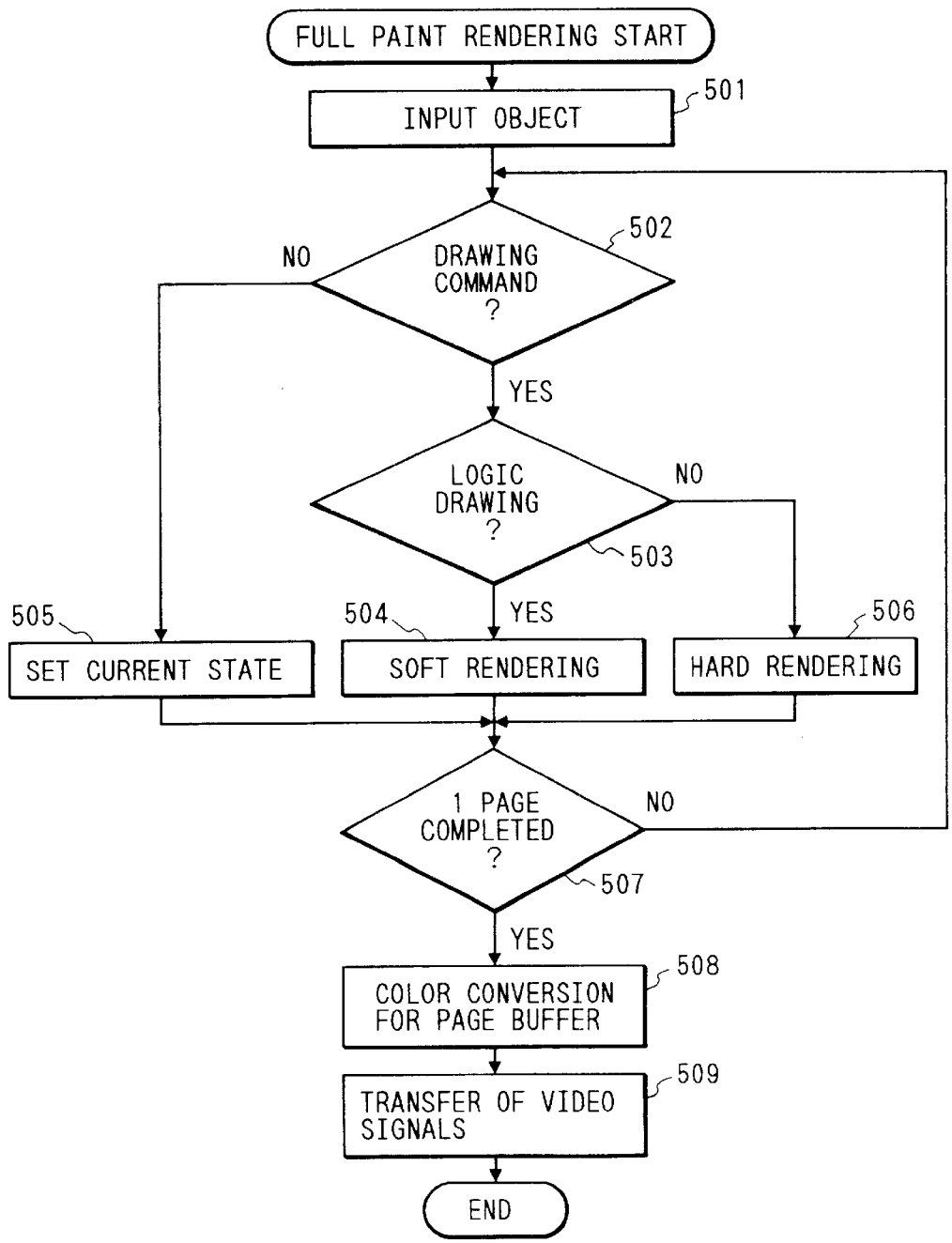
FIG. 10 is a flowchart showing the overview of a full paint rendering process in one embodiment of the invention.

Next, the color logical drawing process at step 112 as above will be described using the flowcharts of FIGS. 9 and 10 showing the flow of color information. In this logical drawing, color background information (RGB data) 401 input from the host computer 1 is converted into page object form (RGB obj) 405 which either the rendering hardware or software can handle. Note that the program as shown in the flowchart of FIG. 10 is stored in the program ROM 6 and executed by the CPU 12.

First, in the printing apparatuses which require real time rendering, such as an LBP, to implement the high grade logical drawing as shown below, the rendering on the full page buffer 10 with lower resolution and/or gradation occurs, instead of the band rendering. Also, the hard renderer 9 which requires the simpler and faster processing cannot perform the real-time resolution conversion of run length or convex polygonal information in rendering. Thus, the processing below is needed, but not necessarily for the ink jet printer.

The pre-processing for rendering includes connecting two lines into one run length and recalculating the apex information for convex polygon when lowering the resolution from 600 DPI (dots/inch) to 300 DPI. This is performed for all the mask information in the page buffer by an interpreter task 201. As for the run length, assuming that the start and end points in the X coordinate of two lines i, i+1 at e.g., 600 DPI to be $x_1(i)$, $x_r(i)$, $x_1(i+1)$ and $x_r(i+1)$, respectively, new one start and end points at 300 DPI are given by:

$$\text{new-}x_1(i)=\min\cdot 1/2(x_1(i), x_1(i+1))$$

$$\text{new-}x_r(i)=\max\cdot 1/2(x_r(i), x_r(i+1))$$

As for the image, the scaling factor in the x and y directions are halved, respectively, but the image information itself of the page object is not changed.

On the other hand, because 1, 2, 4 and 8 bit rendering is supported to enable the easy rendering despite lower gradation of the page buffer, the pre-processing load on the interpreter is not large.

A processing procedure of a portion concerning the full-paint rendering (color logical drawing) following this processing is shown in a flowchart as shown in FIG. 10. At step 501, the object (intermediate data) converted by the interpreter is input, and at step 502, a check is made to see whether or not the input object is a drawing command. If not, the background information or (logical) drawing mode is substituted into the global variable holding current information at step 505. Then, the operation transfers to step 507 as hereinafter described.

If the input object is a drawing command, the current logical drawing mode and the state flag are checked at step 503. If the drawing mode is a processing capable of the fast rendering with hardware, such as overwriting or transparent (the state flag is 1), the hard rendering is executed at step 506. This is a processing equivalent to the fast processing of the hard renderer with the banding already explained. The only difference is that a different dither matrix must be loaded because the rendering is made with the YMCK color in the fast banding process, and with the RGB color in this full page mode.

On the other hand, when the high grade logical drawing is designated (the state flag is 0), the software rendering is executed at step 504. After fetching (getting) the color information of the page buffer (D, destination) 407 of full page and the current background object (S, source) 405 as shown in FIG. 9, and making a logical operation on it, the result is stored in the full page buffer 407. A typical logical operation processing includes operating the following items for each of the RGB components in view of the bit depth. In the software rendering, the creation of a source image is aimed to apply the logical drawing as described below by applying the same algorithm as the hard renderer 9, wherein a page buffer access library is created for each logical drawing method. In order to mix the software rendering and the hardware rendering, an interrupt occurs in the CPU 12 upon termination of the hard rendering to cause the CPU 12 to fetch the next page object subsequently.

Addition, D=S+D

Subtraction, D=D−S

Blend with α value specified by the user, D=α×S+(1−α)×D

Maximum value, D=Max(S,D)

Minimum value, D=Min(S,D)

This high grade logical drawing is typically operated on RGB Data useful with the CRT (cathode ray tube) display for the host computer 1. Therefore, to effect the same color reproduction as the host computer, the logical drawing is necessary to implement on the RGB color model within the printer. Accordingly, in the full paint mode of logical drawing, the page buffer 407 must be of the RGB color model. Also, the page object information 405 is necessary to be also of the RGB color model.

As already described, in the fast banding process, as the background information in the page object information is held in the YMCK color model, it is necessary to have the RGB color as the page object to make this logical drawing. Consequently, if the rendering process for data of one page is ended at step 507, all the information in the page buffer 10 is converted from RGB to YMCK at step 508, and the video data of YMCK is sent through the printer interface 11 to the printer 13 at step 509.

Figure 11:
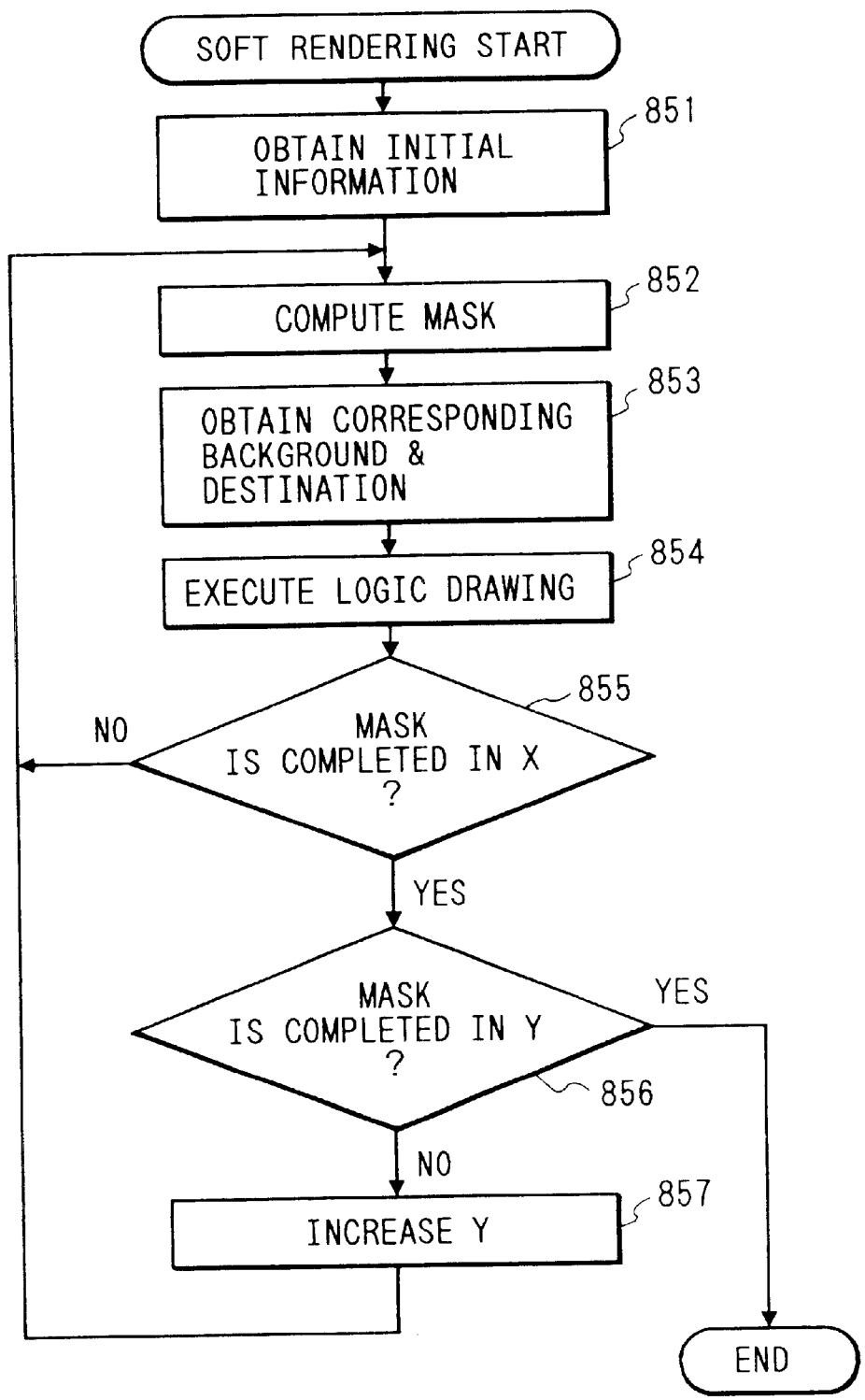
FIG. 11 is a flowchart showing the overview of soft rendering process in one embodiment of the invention.

Herein, the soft rendering process at step 504 will be described in detail with reference to a flowchart of FIG. 11. Note that the program as shown in the flowchart of FIG. 11 is stored in the program ROM 6 and executed by the CPU 12. If the CPU 12 determines that the state flag is 0 at step 503 in FIG. 10, the mask information from an address at 21 as pointed to by a mask pointer, the BG information from an address at 22, and the logical drawing information at 23, as shown in FIG. 3, are acquired (step 851).

This data is basically created every time mask data is entered into the PDL analyzing portion, the logical drawing or BG data holding the current state, and combined with the mask information.

At step 852, the leftmost upper end X and Y coordinates for drawing in the band are calculated from the mask information acquired. The BG multi-value information corresponding to the X, Y coordinates (e.g., for the tile with a depth of 32*32 bit-pixel): tile-address=tile-top-address (R, or G, or B)+(Y mod 32)*tile-width (byte boundary)+(X mod 32)*bit-pixel(tile)/8 and the destination address in the page buffer 310 are obtained (step 853). The memory address at which data is stored is calculated by the expression:

band-address=band-top-address+$Y$*band-width(byte boundary)+ $x$*bit-pixel(band)/8 and the rendering (logical drawing) for source, BG and destination information is executed in accordance with the designated logical drawing (step 854).

To extend this processing over the scan line direction of X, the recalculation of the next information with the mask and the update of BG and destination information in accordance with the above expression are performed (steps 852, 853). Then, if the scan is ended, a check is made to see whether or not the mask is ended at the next scan line (Y=Y+1) at step 856. If so, this processing is terminated and step 507 of FIG. 10 is executed. If not, Y is incremented at step 857, and the leftmost coordinate as the X coordinate is calculated, and the operation transfers to step 852 to repeat the same processing.

Figure 12:
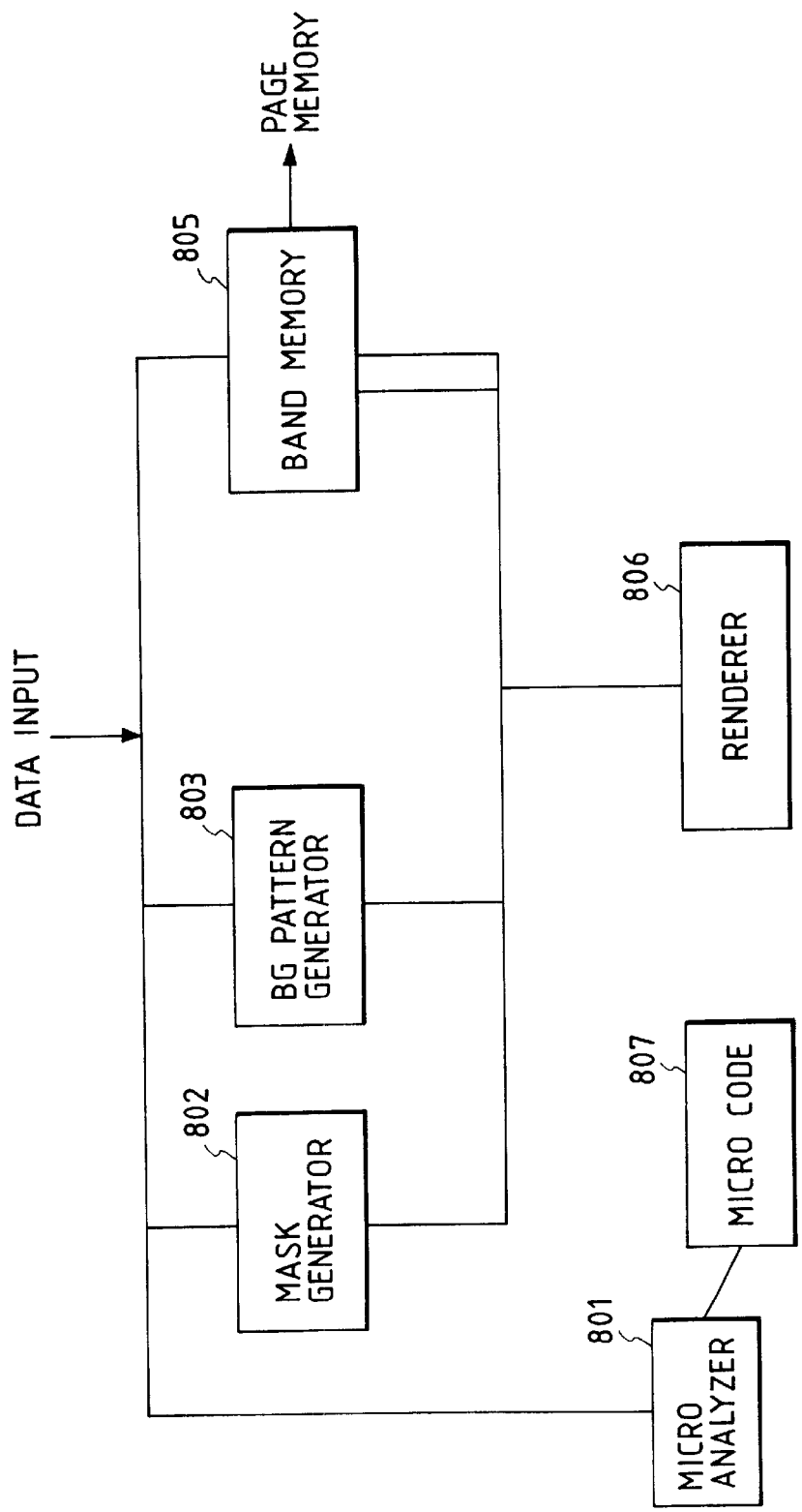
FIG. 12 is a diagram showing a hardware configuration for performing hard rendering process in one embodiment of the invention.

Next, the hard rendering process at step 506 as above will be described in detail using a hardware configuration diagram as shown in FIG. 12. Note that the hardware configuration diagram as shown in FIG. 12 shows the hard renderer 9 of FIG. 1 in more detail.

FIG. 12 is an implementation example for executing the hardware rendering. Simply introducing the configuration, a micro execution/analysis portion 801 reads a micro code (807), and necessary BG, mask information is cut out in accordance with the intermediate information of FIG. 3 analyzed and created for each block to supply necessary information. Then, the hardware rendering is started to perform the processing in parallel for each of blocks 802, 803, 805.

802 is to receive the input mask information via an FIFO, sending the mask information to the decode portion in accordance with information such as RL, trapper and bit map to analyze it, creating the X, Y coordinates of concern, passing them to a BG creation block circuit 803 and a band memory block 805, and triggering to send the corresponding information to a rendering block 806.

The BG pattern creation circuit block 803 creates a BG pattern for specified X, Y locations in accordance with an algorithm as explained in the above soft rendering.

The rendering circuit block 806 collects the mask, BG, destination pattern, carrying out the rendering in accordance with the logical drawing mode, storing the result of rendering (bit map data) in the band memory 805 and then in the page buffer 10. Herein, the processing speed is determined depending on the slowest process of three patterns.

Thus, the mask creation, rendering process is continued until the whole area of one mask is covered.

The hard rendering is performed by inputting the next pointer information as indicated at 24 in FIG. 3 to attempt the rendering, if the rendering for one data is ended. Note that if it is determined that the hard rendering for data is impossible, that is, the state flag is soft rendering, the start of soft renderer (program) is requested to the CPU with an interrupt signal and the start address of current intermediate data unprocessed is designated.

Figure 13:
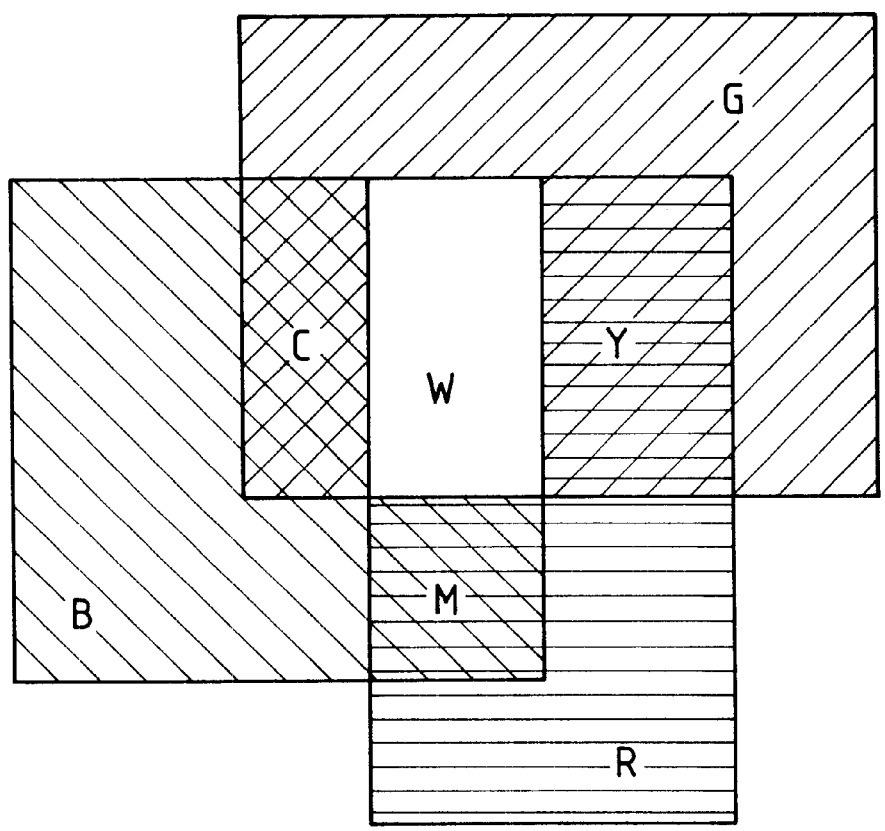
FIG. 13 is a view showing the result of color logical drawing in one embodiment of the invention.

Finally, the result of logical drawing is shown using FIG. 13. This original view is represented in color, but as the color representation cannot be annexed as the drawing, the color difference is represented by hatching for convenience's sake. In the figure, R is red, G is green, B is blue, Y is yellow, M is magenta, C is cyan, and W is white. This is an example in which the logical operation is applied in view of the bit depth D=S+D, illustrating the principle of additive primaries method for CRT. In the figure, the addition of Cyan=Green+ Blue, Yellow=Red+Green, Magenta=Red+Blue, and White= Red+Green+Blue is applied.

Figure 14:
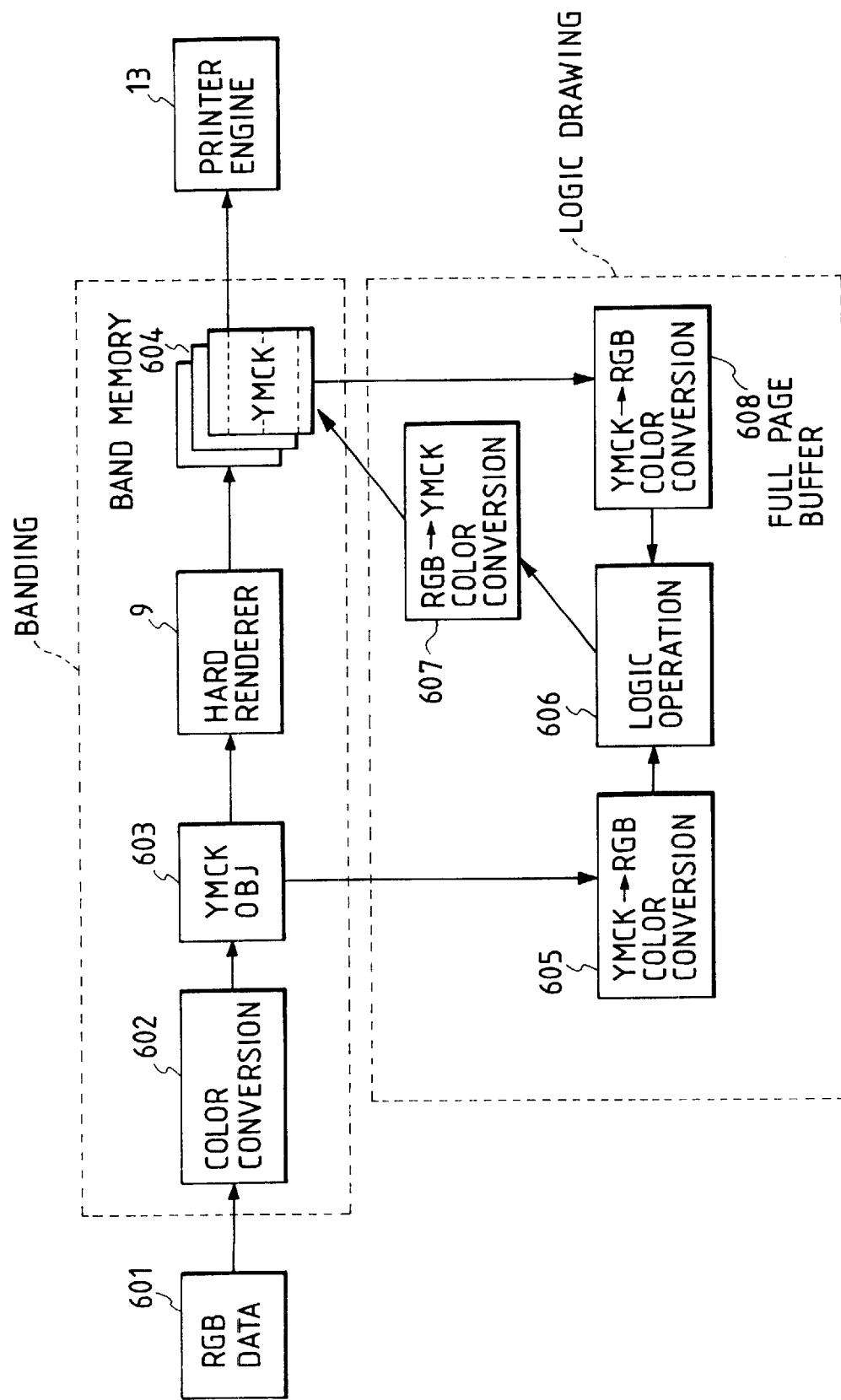
FIG. 14 is a block configuration diagram relating to color processing in the logical drawing in one embodiment of the invention.

The configuration of a second embodiment of the invention is shown in FIG. 14. In the previous embodiment as shown in FIG. 9, an example of possessing YMCK page object and YMCK page buffer in the fast rendering with banding, or RGB page buffer and RGB page object in the high grade logical drawing was presented. In this example, it is necessary to possess the page object in the color mode for both RGB and YMCK, consuming more area of the management RAM 7 of FIG. 1. Thus, in this embodiment as shown in FIG. 14, an example of promoting the reduction of recording area by possessing the page buffer and the page object in YMCK in both the fast banding process and the logical drawing is presented.

The fast banding process for the upper half in FIG. 14 is identical to that as shown in FIG. 9, the explanation thereof being omitted, and the logical drawing path for the lower half is only described. In making the rendering with the high grade logical drawing of color, first, the background data 603 of page object corresponding to source (S) is inversely converted from YMCK to RGB in a color conversion unit 605. Likewise, the source and a portion of logical drawing in the page buffer (D) 604 already rendered is inversely converted in a color conversion unit 608.

The problem herein is that if the simple log conversion is applied in converting RGB to YMCK in the color conversion process, the inverse conversion can be easily calculated, but if UCR (under color removal) and the masking process are applied, it is impossible to inversely convert completely YMCK to RGB without degrading the accuracy. Also, it will take too much computation amount to make such a conversion in real time.

Thus, in the processing of this second embodiment, an approximate conversion table from YMCK to RGB is prepared in simulation for each pattern of bit depth 2, 4, 8, and RGB data obtained using this approximate conversion table is used as the inverse conversion data. In 2 bits in the approximate conversion table, the table is 256 bytes, and in 4 bits, the table is 65,536 bytes, both of which are of a feasible memory size. However, in 8 bits, the data amount is too large, wherein it is preferable that the user has a choice of using the 4-bit table at the expense of color accuracy or calculating by software with the increased computation time.

Based on the information of S and D in the RGB model obtained in the above way, the logical operation 606 is executed, and RGB data obtained is converted into YMCK data, using the color conversion hardware 8, which data is stored in the page buffer 10. The stored data is finally transferred as video signal through the printer interface 11 to the color printer engine 13.

According to the second embodiment as described above, the color printing apparatus 1000 inputs color page description information, and analyzes this input information to create intermediate information for recording, upon which intermediate information the fast rendering is enabled with the hardware, and in which a high grade color logical drawing function which cannot be supported by the hardware is switched into the software rendering. Thereby, it is possible to make the effective use of the fast processing function with the hardware, and to implement the color logical drawing function with smaller memory capacity to be consistent with the normal fast logical drawing, while retaining a certain high degree of color quality against reduced color gradation and/or resolution.

Also, according to the second embodiment as described above, the recording area can be reduced by possessing the page buffer and the page object in YMCK in both the fast banding process and the logical drawing.

In the above embodiment, if the banding is possible in the rendering process as shown in FIG. 6, the band rendering is executed, while if the banding is impossible, the color logical drawing of full paint is executed by switching automatically between the soft rendering and the hard rendering.

In a third embodiment as described below, if the banding is possible, the highest color gradation band rendering is executed, while if the banding is impossible, the degrade rendering with less resolution and/or gradation is executed.

Figure 15:
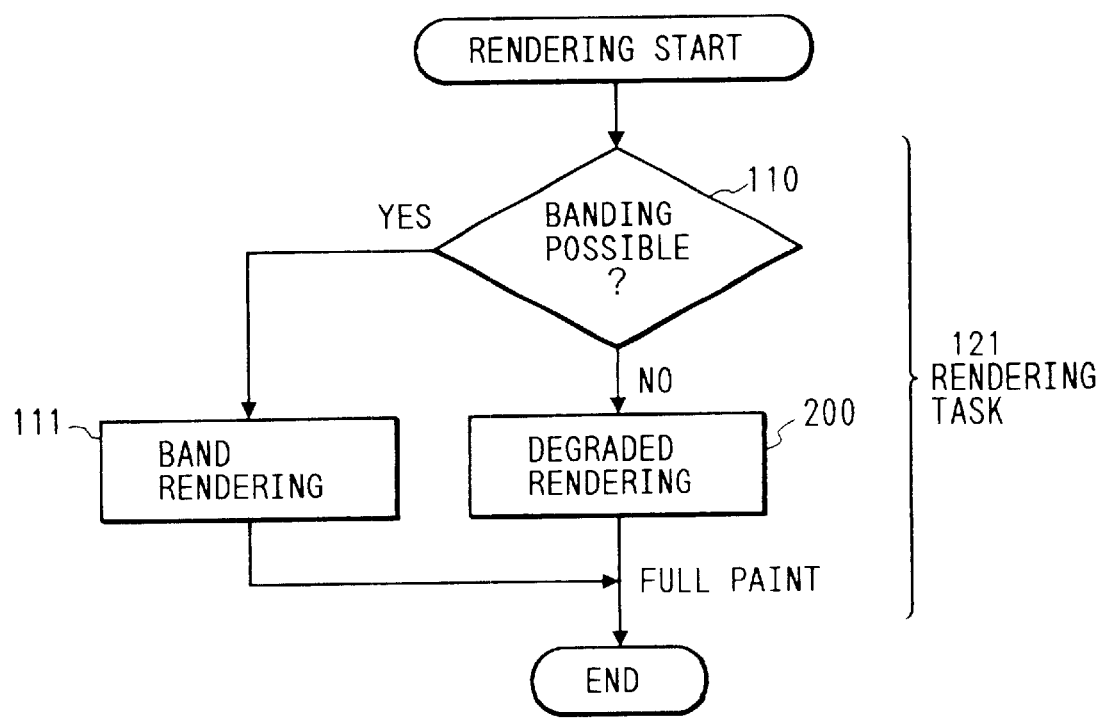
FIG. 15 is a flowchart showing the overview of an overall rendering process in one embodiment of the invention.

Next, the rendering process (rendering task) according to the third embodiment will be described, using a flowchart as shown in FIG. 15.

Note that the program as shown in the flowchart of FIG. 15 is stored in the program ROM 6 and executed by the CPU 12.

If the CPU 12 determines that the PDL command analysis of one page is ended at step 109 of FIG. 2, this program is started. At step 110, a check is made to see whether or not the band rendering (banding) process is possible as a pre-processing for rendering the page object. And if the banding process is judged to be possible at step 110, the band rendering as described in the first embodiment is executed, while if the banding process is judged to be impossible at step 110, the degrade rendering in this third embodiment is executed at step 200.

Note that the judgment processing at step 110 and the band rendering process at step 111 are identical to those of the first embodiment, the explanation thereof being omitted, but for instance, an instruction such as Flood Fill (painting with point designation) cannot execute the rendering with the banding, whereby if such information is detected at step 110, a full paint flag (full-p-lag) is set, and the rendering is performed in the full paint (degrade) mode with the resolution and/or gradation of printing compulsorily lowered at step 200.

The banding process at step 111 can be implemented by having the page buffer substantially as large as 256($Y$ size)*4 (color)* 8 (color depth)*2*4800($A$4, width of 400 DPI)/8=10 MB.

Since at the time of banding, the page buffer consists of 8 bits for each color, and the PDL information coming from the host typically consists of 1, 2, 4, 8 bits, the corresponding YMCK 1, 2, 4, 8 bit information is stored as the page object to make the bit extended processing via a look-up table at the time of rendering. This processing has significantly less operation cost than the dither or error diffusion method as will be described later.

Note that if the band rendering is judged to be impossible at step 1102, the degrade process is executed at step 2002.

Figure 16:
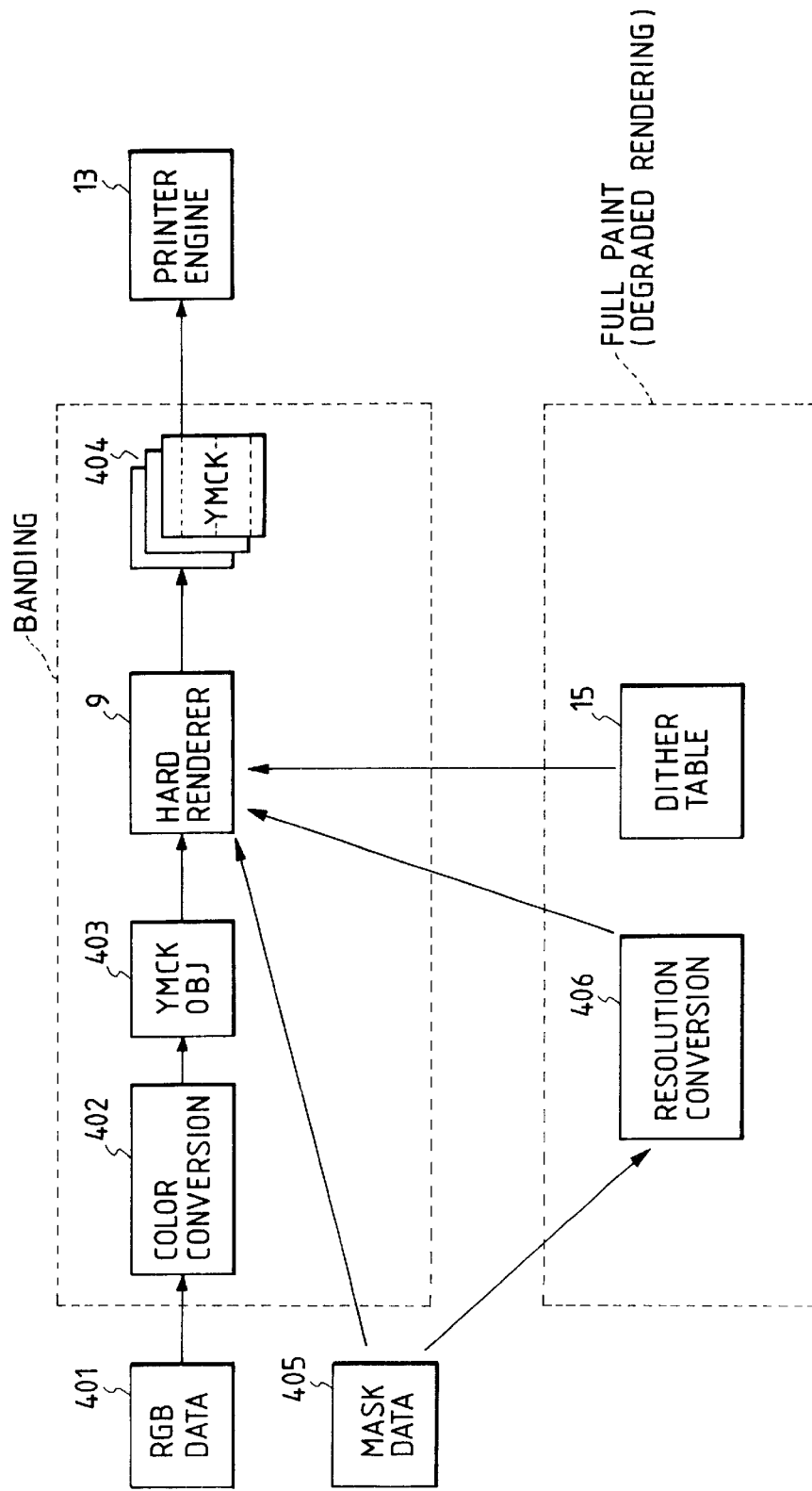
FIG. 16 is a block configuration diagram relating to banding rendering process and degrade rendering process in one embodiment of the invention.
Figure 17:
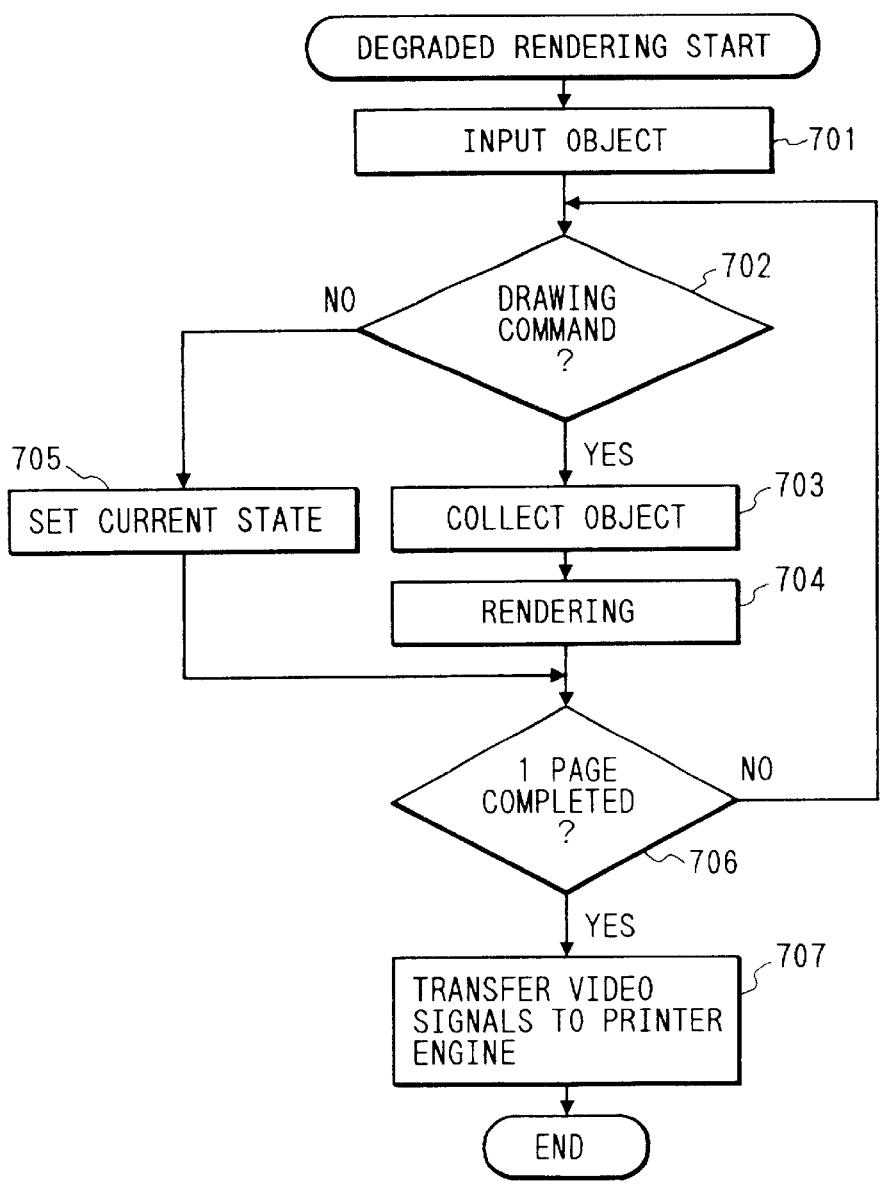
FIG. 17 is a flowchart showing the overview of a degrade rendering process in one embodiment of the invention.

Referring to the flowcharts of FIGS. 16 and 17 showing the flow of color information which is the key of the third embodiment, the third embodiment will be described below.

Since the degrade process cannot perform the rendering in real time, the rendering is made on the buffer 10 corresponding to the full bit map (bit depth 2 or 4 bits) with less resolution and/or gradation. The rendering hardware 9 requiring simpler and faster processing cannot execute the real time resolution conversion for the run length or polygonal information at the time of rendering. Thus, the processing as shown below is necessary to be executed before the rendering, but is unnecessary for the BJ printer.

The pre-processing for rendering includes connecting two lines into one run length and recalculating the apex information for convex polygon, when lowering the resolution from 600 DPI to 300 DPI, for example. This is performed for all the mask information in the page buffer by the interpreter task 201. As for the run length, assuming that the start and end points in the X coordinate of two lines i, i+1 at e.g. 600 DPI to be $x_1(i)$, $x_r(i)$, $x_1(i+1)$ and $x_r(i+1)$, respectively, new one start and end points at 300 DPI are given by:

$$\text{new-}x_1(i)=\text{min}\cdot 1/2(x_1(i), x_1(i+1))$$

$$\text{new-}x_r(i)=\text{max}\cdot 1/2(x_r(i), x_r(i+1))$$

As for the image, the resolution conversion 406 halves each of the scaling factors in the x and y directions, without changing the image information itself of the page object.

On the other hand, because the renderer supports the rendering of 1, 2, 4 and 8 bits with the software or hardware despite lower gradation of the page buffer, the background information, unlike the mask, does not need any processing particularly requiring the CPU power.

The degrade rendering process at step 200 of FIG. 15 will be described below, using a flowchart of FIG. 17. The program as shown in the flowchart of FIG. 17 is stored in the program ROM 6 and executed by the CPU 12. At step 701, the CPU 12 inputs the mask and background information converted in resolution by the interpreter task, and checks to see whether or not input object is a drawing command at step 702. If not, the background information or (logical) drawing mode is substituted into the global variable holding the current information at step 705.

On the other hand, if it is determined to be a drawing command, the mask, background and logical drawing information are collected at step 703, and the rendering with the hardware is executed at step 704. In doing so, because the page buffer consists of 2 or 4 bits, if an image of 8 bits is input as the background from the PDL, the processing of dither or error diffusion is necessary to be executed for the conversion into 2 or 4 bits.

Note that if the state flag is 0 at step 704 of FIG. 17, the soft rendering is executed, while if the state flag is 1, the hard rendering is executed, as described with the flowchart of FIG. 10.

Accordingly, in performing the degrade rendering (rendering with lower resolution and/or gradation), the soft rendering can be automatically switched into the hard rendering.

Figures 18A, 18B, 18C:
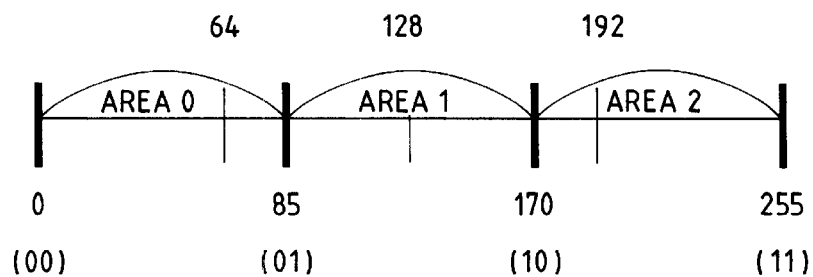
FIGS. 18A to 18C are explanatory views relating to dither processing in one embodiment of the invention.

The principle of a multi-value dither method will be described using FIGS. 18A to 18C, but this processing is required when the color gradation of input data is higher than the gradation of page memory.

To explain the dither processing, an algorithm of the principle of the conversion into simpler multi-value will be described below with an example of converting 8-bit (256 level) input as a multi-value into 2-bit form (four values).

If the noticed pixel has an input value below 64, 64 to 128, 128 to 192, or 255 or less, the value 0(00), 85(01), 170(10) or 255 (11) is output, respectively. This is shown in FIG. 18A, wherein a threshold (64, 128, 192) for an AREA to which the input belongs is employed inside the AREA to perform such binarization processing that the output occurs at both ends of the AREA. The bold vertical line in the figure delimits the area, the output values indicated below with 8-bit level and 2-bit level put in parentheses ( ). The fine vertical line indicates the threshold 8-bit level within the area.

An example of applying this binarization processing to the multi-value dither will be described below with reference to FIGS. 18B and 18C. A threshold value suitable for its area is calculated from the values of noticed pixel data as shown in FIG. 18B and a dither matrix corresponding to noticed pixels as shown in FIG. 18C, to binarize the data of the noticed pixel with this threshold. Herein, the dither matrix consists of a pattern of 4*4, the same pattern repeated on the page buffer. The maximum value of the dither matrix is 255/(bit level-1). If input data is processed for enlargement or reduction, it is already converted into the resolution of page memory.

A practical dither algorithm will be explained below.
1. Read a noticed pixel in the input data, and determine to what AREA it belongs. → The noticed pixel is 180, and belongs to AREA 2.
2. Read a corresponding dither matrix, and change it into a threshold corresponding to this AREA. → threshold= 74+85×2=244
3. Output the maximum value for this AREA if the noticed pixel data is equal to or greater than the threshold, or output the minimum value of this AREA if below the threshold. → Because noticed pixel (180)<threshold (244), the minimum value (170) of the AREA is output.
4. Process the next pixel.

For this processing, the fast conversion can be made with the hardware by using a look-up table. This table can be implemented by prestoring 2-bit output values dither converted at each location of 4*4 dither matrix for each input level from 0 to 255.

Figures 19A, 19B:
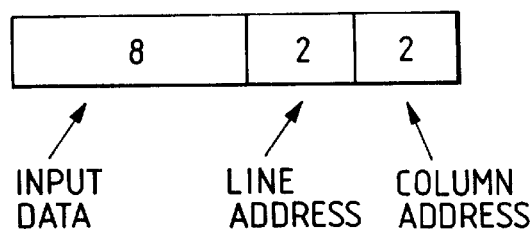
FIGS. 19A to 19B are views showing a hardware configuration for making the dither processing in one embodiment of the invention.

The table size herein is required to have 256×4×4×2 bit=1024 byte for each of YMCK, each 2 bits being accessed from the dither table of FIG. 19B as pointed to by a pointer as shown in FIG. 19A.

At step 706, if the rendering process for the mask data of one page is ended, data is sent through the engine I/F to the printer for every YMCK plane, synchronously with the horizontal/vertical synchronizing signal (step 707).

Note that the rendering for the input data can be also made directly or by discarding the bit, like the banding process, without performing any dither processing in the degrade process. Consequently, particularly in the software processing, the printing quality may be lowered, but the printing process can be made faster than the dither processing, and positioned as the draft mode by the user.

This is in the form of performing the resolution conversion 406 but not referring to the dither table 15 at the time of degrade in FIG. 16.

While the dither processing has been exemplified as the pseudo-gradation processing to enhance color accuracy at the degrade, other embodiments may be applicable, including an error diffusion method and an average density preserving method.

Also, while this embodiment has been described on the presumption that the gradation may fall at the degrade, the user can extend the page memory as an extension RAM, and if the full memory of 256 gradations can be obtained, the pseudo-gradation conversion through the dither is obviated at the degrade.

As described above, according to the third embodiment, in the color printers of printing color PDL information in multi-value representation without having a quantity of a full bit map, the banding process is executed with the highest color gradation, when the banding process is permitted, or the degrade rendering process is executed in the mode of applying the dither or error diffusion (or mode attaching importance to color reproduction), or the mode of attaching importance to the speed but not the color reproduction, when the banding process is impossible. By the user designating these both modes, it is possible to perform the color printing in accordance with the intent of the user.

Figure 20:
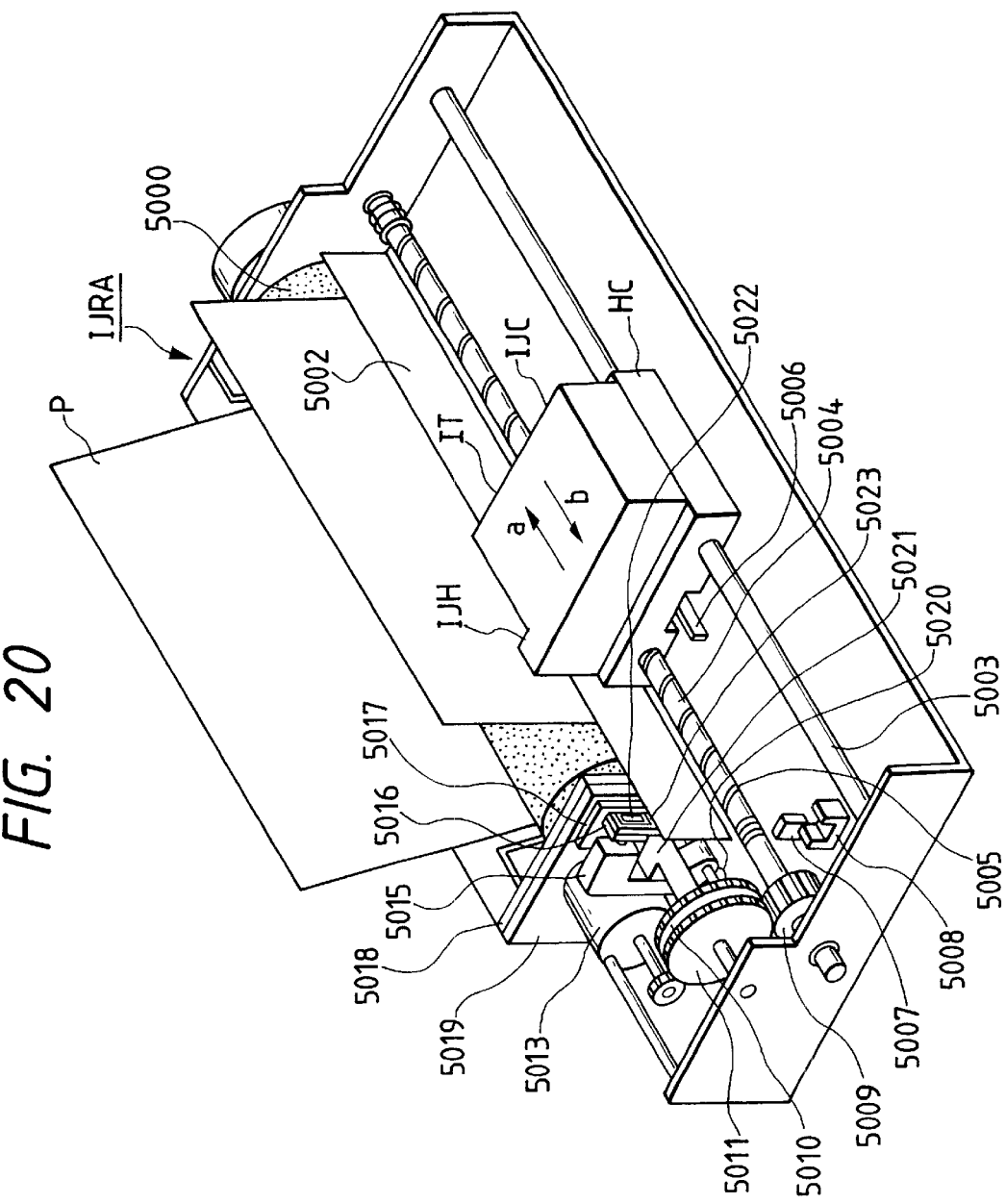
FIG. 20 is an external view of an ink jet printer to which the invention is applicable.

FIG. 20 shows an appearance view of a color ink jet printer apparatus 1000 as one example of a color printer engine 13 to which this embodiment is applied. Note that the control unit except for the color printer engine 13 in FIG. 1 is not shown in FIG. 20. In FIG. 20, a carriage HC is engaged in a spiral groove 5004 for a lead screw 5005 rotating via driving force transmission gears 5011, 5009 along with the forward and reverse rotations of a drive motor 5013. The carriage HC has a pin (not shown) engaging the spiral groove 5004, thereby being reciprocated in the directions of the arrow a, b. This carriage HC has an ink jet cartridge IJC mounted thereon. 5002 is a paper presser plate for pressing the paper against a platen 5000 along the movement direction of the carriage HC. 5007, 5008 is home position detecting means, composed of a photo-coupler, for confirming the existence of a lever 5006 of the carriage HC in this area to switch the rotational direction of the motor 5013. 5016 is a cap member for capping (covering) the entire surface of recording head in the ink jet cartridge IJC, and 5015 is suction means for sucking the inside of this cap member 5016, whereby the recording head is subjected to suction recovery via a cap inner opening 5023. 5017 is a cleaning blade, and 5015 is a member for allowing this cleaning blade to be moved in the forward and backward directions, these being supported on a main body support plate 5018. It is needless to say that the cleaning blade is not limited to the above form but may be any of known cleaning blades. Also, 5012 is a lever for starting the sucking operation in the suction recovery, moving along with the movement of a cam 5020 engaging the carriage HD, the driving force from the driving motor 5013 being controlled for movement by well-known transmission means via the clutch switching. Each of capping, cleaning and suction recovery is configured to make a desired processing at a predetermined location under the action of the lead screw 5005 when the carriage HC comes to an area at the home position, but may be actuated at other timing.

Figure 21:
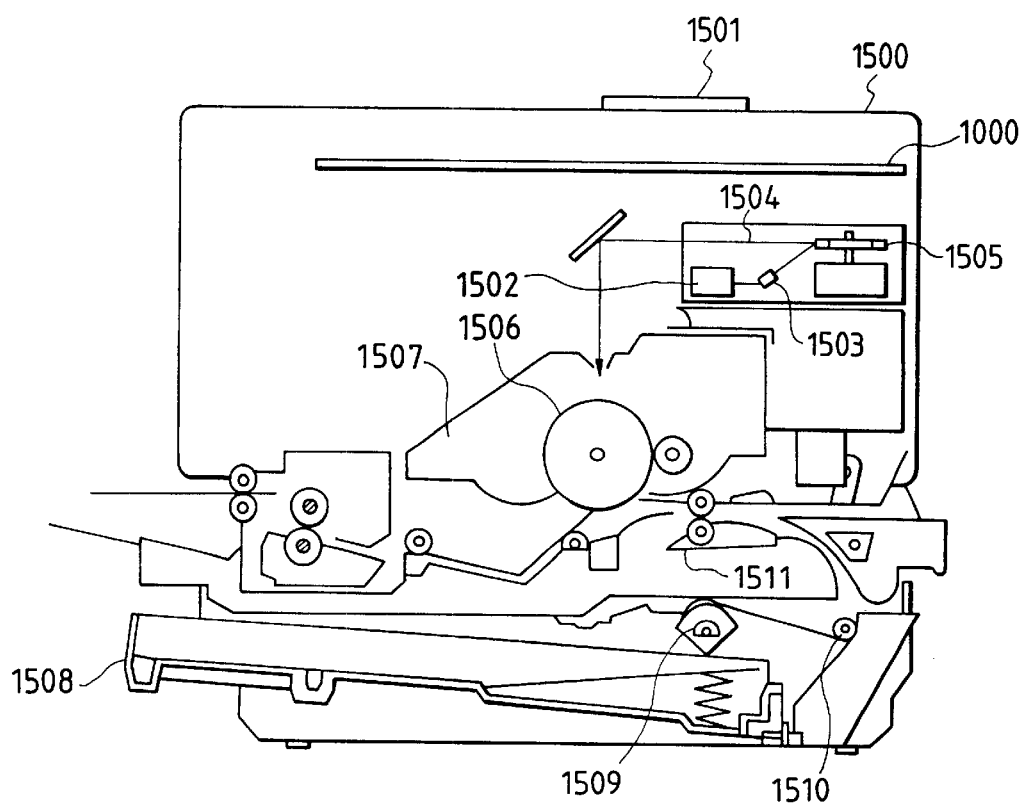
FIG. 21 is a cross-sectional view of a laser beam printer to which the invention is applicable.

FIG. 21 is a cross-sectional view showing the construction of a printer, e.g., a laser beam printer (LBP), to which this embodiment is applicable.

In the figure, 1500 is an LBP main device for inputting and storing therein the print information (character code) or form information or mask instruction supplied from the host computer connected externally, as well as creating the character pattern or form pattern corresponding to such information to form the image on the recording paper which is a recording medium. 1501 is an operation panel on which the operation switches and an LED display are disposed, and 1000 is a printer control unit for controlling the whole of the LBP main device 1500 as well as analyzing the character information supplied from the host computer. This printer control unit 1000 principally converts the character information into video signal corresponding to character pattern which is then output to a laser driver 1502. The laser driver 1502 is a circuit for driving a semiconductor laser 1503 to switch on or off a laser beam 1504 emitted from the semiconductor laser 1503 in accordance with the input video signal. The laser beam 1504 is swung by a rotational polygon mirror 1505 in left and right directions to scan on an electrostatic drum 1506 for the exposure. Thereby, an electrostatic latent image of character pattern is formed on the electrostatic drum 1506. This latent image is developed by a developing unit 1507 disposed on the periphery of the electrostatic drum 1506, and then transferred onto the recording paper. This recording paper is a cut sheet, cut sheet recording papers contained within a paper cassette 1508 mounted on the LBP 1500, and carried into the apparatus by means of a paper supply roller 1509, and conveying rollers 1510, 1511, to be supplied to the electrostatic drum 1506. Also, the LBP main device 1500 is constructed to have at least one card slot, not shown, or more, to permit the connection of an option font card and a control card of different language system (emulation card), in addition to a contained font.

It should be noted that printer to which this embodiment is applied is not limited to the laser beam printer and the ink jet printer, but may be a printer of another system.

What is claimed is:

1. A color image processing apparatus comprising:
   first conversion means for converting input information into intermediate data of a first type of color element representation;
   obtaining means for obtaining image data of the first type of color element representation based on the intermediate data converted by said first conversion means;
   second conversion means for converting image data of the first type of color element representation into image data of the second type of color element representation; and
   third conversion means for converting image data of the second type of color element representation into image data of the first type of color element representation,
   wherein in applying a logic operation on image data of the first type of color element representation, said apparatus is operable in a first mode in which the logic operation is applied directly to the image data of the first type of color element representation obtained by said obtaining means, or in a second mode in which the logic operation is applied to the image data of the second type of color element representation converted by said second conversion means and then the image data of the second type of color element representation to which the logic operation is applied is converted into the image data of the first type of color element representation by said third conversion means.

2. An apparatus according to claim 1, further comprising decision means, responsive to a logic drawing command included in the input information, for deciding in which one of the first and second modes a logic drawing process is to be executed for the logic drawing command.

3. An apparatus according to claim 2, further comprising determination means for determining one of a plurality of grades including a first grade and a second grade lower than the first grade as a grade of image data to be obtained from the input information by a rendering operation, wherein said determination means determines the second grade as the grade of image data to be obtained from the input information by the rendering operation when said decision means decides that the logic drawing process is to be executed in the second mode for the logic drawing command.

4. An apparatus according to claim 1, wherein the logic operation is executed with hardware in the first mode and with software in the second mode.

5. An apparatus according to claim 1, further comprising means for determining whether a band process is to be executed.

6. An apparatus according to claim 5, wherein said determining means includes means for detecting whether the input information includes a predetermined command for which a hardware rendering process cannot be applied, and wherein said determining means determines that the band process is not to be executed, if said detecting means detects that the input information includes the predetermined command.

7. An apparatus according to claim 5, wherein said determining means includes means for deriving a time required for said obtaining means to obtain the image data of the first type of color element representation based on the intermediate data to be drawn in a band, and wherein said determining means determines that the band process is not to be executed if the time derived by said deriving means exceeds a predetermined value.

8. An apparatus according to claim 1, wherein the first type of color element representation comprises YMCK representation.

9. An apparatus according to claim 1, wherein the second type of color element representation comprises RGB representation.

10. A color image processing method comprising the steps of:
    converting input information into intermediate data of a first type of color element representation in a first conversion step;
    obtaining image data of the first type of color element representation based on the intermediate data converted in said first conversion step;
    converting image data of the first type of color element representation into image data of a second type of color element representation in a second conversion step; and
    converting image data of the second type of color element representation into image data of the first type of color element representation in a third conversion step,
    wherein in applying a logic operation on image data of the first type of color element representation, said apparatus is operable in a first mode in which the logic operation is applied directly to the image data of the first type of color element representation obtained in said obtaining step, or in a second mode in which the logic operation is applied to the image data of the second type of color element representation converted in said second conversion step and then the image data of the second type of color element representation to which the logic operation is applied is converted into the image data of the first type of color element representation in said third conversion step.

11. A method according to claim 10, further comprising a decision step, responsive to a logic drawing command included in the input information, for deciding in which one of the first and second modes a logic drawing process is to be executed for the logic drawing command.

12. A method according to claim 11, further comprising a determination step for determining one of a plurality of grades including a first grade and a second grade lower than the first grade as a grade of image data to be obtained from the input information by a rendering operation, wherein said determination step determines the second grade as the grade of image data to be obtained from the input information by the rendering operation when said decision step decides that the logic drawing process is to be executed in the second mode for the logic drawing command.

13. A method according to claim 10, wherein the logic operation is executed with hardware in the first mode and with software in the second mode.

14. A method according to claim 10, further comprising a step of determining whether a band process is to be executed.

15. A method according to claim 14, wherein said determining step includes a step of detecting whether the input information includes a predetermined command for which a hardware rendering process cannot be applied, and wherein said determining step determines that the band process is not to be executed, if said detecting step detects that the input information includes the predetermined command.

16. A method according to claim 14, wherein said determining step includes a step of deriving a time required for said obtaining step to obtain the image data of the first type of color element representation based on the intermediate data to be drawn in a band, and wherein said determining step determines that the band process is not to be executed if the time derived by said deriving means exceeds a predetermined value.

17. A method according to claim 10, wherein the first type of color element representation comprises YMCK representation.

18. A method according to claim 10, wherein the second type of color element representation comprises RGB representation.

19. A color image processing apparatus which performs image data generation of one band and image data output of another band in parallel, said apparatus comprising:
  conversion means for converting input information provided in a page description language of a first type of color element representation used in a higher-class apparatus into intermediate data band by band, the intermediate data having a second type of color element representation used in a printer unit, the first and second types of color element representations being different from each other;
  generating means for generating, band by band, image data of the second type of color element representation based on the intermediate data converted by said conversion means; and
  print control means for controlling a banding process for one continued page in printing the image data generated by said generating means,
  wherein said conversion means not only converts the input information into the intermediate data, but also converts the first type of color element representation into the second type of color element representation.

20. An apparatus according to claim 19, wherein said conversion means retains the intermediate data sorted band by band and said generating means generates the image data after said conversion means has retained one page of the intermediate data.

21. An apparatus according to claim 20, wherein said generating means comprises hard rendering.

22. An apparatus according to claim 19, further comprising:
  determining means for determining whether said generating means is to generate the image data of the second type of color element representation band by band;
  second conversion means for converting the intermediate data having the second type of color element representation reversely into intermediate data having the first type of color element representation, if said determining means determines that said generating means is not to generate the image data of the second type of color element representation; and
  rendering means for rendering the intermediate data having the first type of color element representation converted by said second conversion means color element by color element.

23. A color image processing apparatus comprising:
  generating means for generating, from input information provided in a page description language of a first type of color element representation used in a higher-class apparatus, image data of a second type of color element representation used in a printer unit;
  first conversion means for converting image data of the second type of color element representation into image data of the first type of color element representation; and
  second conversion means for converting image data of the first type of color element representation into image data of the second type of color element representation,
  wherein said apparatus can be operated in a first mode in which the image data of the second type of color element representation generated by said generating means is output to the printer unit, or in a second mode in which the image data generated by said generating means is converted into the image data of the first type of color element representation by said first conversion means and the image data of the first type of color element representation is converted into the image data of the second type of color element representation by said second conversion means and then output to the printer unit.

24. An apparatus according to claim 23, further comprising decision means, responsive to a logic drawing command included in the input information, for deciding in which one of the first and second modes a logic drawing process is to be executed for the logic drawing command.

25. An apparatus according to claim 24, further comprising determination means for determining one of a plurality of grades including a first grade and a second grade lower than the first grade as a grade of image data to be obtained from the input information by a rendering operation, wherein said determination means determines the second grade as the grade of image data to be obtained from the input information by the rendering operation when said decision means decides that the logic drawing process is to be executed in the second mode for the logic drawing command.

26. An apparatus according to claim 24, wherein the logic operation is executed with software in the first mode and with hardware in the second mode.

27. An apparatus according to claim 23, further comprising means for determining whether a band process is to be executed.

28. An apparatus according to claim 27, wherein said determining means includes means for detecting whether the input information includes a predetermined command for which a hardware rendering process cannot be applied, and wherein said determining means determines that the band process is not to be executed, if said detecting means detects that the input information includes the predetermined command.

29. An apparatus according to claim 27, wherein said determining means includes means for deriving a time required for said generating means to generate the image data of the second type of color element representation to be drawn in a band, and wherein said determining means determines that the band process is not to be executed, if the time derived by said deriving means exceeds a predetermined value.

30. An apparatus according to claim 23, wherein the second type of color element representation comprises YMCK representation.

31. An apparatus according to claim 23, wherein the first type of color element representation comprises RGB representation.

32. A color image processing method which performs image data generation of one band and image data output of another band in parallel, said method comprising the steps of:

converting input information provided in a page description language of a first type of color element representation used in a higher-class apparatus into intermediate data band by band, the intermediate data having a second type of color element representation used in a printer unit, the first and second types of color element representations being different from each other;

generating, band by band, image data of the second type of color element representation based on the converted intermediate data; and controlling a banding process for one continued page in printing the generated image data, wherein said converting step not only converts the input information into the intermediate data, but also converts the first type of color element representation into the second type of color element representation.

33. A method according to claim 32, wherein said converting step retains the intermediate data sorted band by band and the image data is generated after one page of the intermediate data is retained in said converting step.

34. A method according to claim 33, wherein said generating step utilizes hard rendering.

35. A method according to claim 32, comprising:

a determining step of determining whether said generating step is to generate the image data of the second type of color element representation band by band;

a second converting step of converting the intermediate data having the second type of color element representation reversely into intermediate data having the first type of color element representation, if said determining step determines that said generating step is not to generate the image data of the second type of color element representation; and a rendering step of rendering the intermediate data having the first type of color element representation converted in said second conversion step color element by color element.

36. A color image processing method, comprising the steps of:

generating, from input information provided in a page description language of a first type of color element representation used in a higher-class apparatus, image data of a second type of color element representation used in a printer unit;

converting image data of the second type of color element representation into image data of the first type of color element representation;

converting image data of the first type of color element representation into image data of the second type of color element representation; and outputting, in a first mode, the generated image data of the second type of color element representation to the printer unit or, in a second mode, converting the generated image data into the image data of the first type of color element representation and converting the image data of the first type of color element representation into the image data of the second type of color element representation and outputting the converted image data to the printer unit.

37. A method according to claim 36, further comprising the step of deciding, in response to a logic drawing command included in the input information, which one of the first and second modes a logic drawing process is to be executed for the logic drawing command.

38. A method according to claim 37, further comprising the step of determining one of a plurality of grades including a first grade and a second grade lower than the first grade as a grade of image data to be obtained from the input information by a rendering operation, wherein the second grade is determined to be the grade of image data to be obtained from the input information by the rendering operation when it is decided that the logic drawing process is to be executed in the second mode for the logic drawing command.

39. A method according to claim 37, wherein the logic operation is executed with software in the first mode and with hardware in the second mode.

40. A method according to claim 36, further comprising the step of determining whether a band process is to be executed.

41. A method according to claim 40, wherein in determining whether the band process is to be executed, it is detected whether the input information includes a predetermined command for which a hardware rendering process cannot be applied, and wherein it is determined that the band process is not to be executed if it is detected that the input information includes the predetermined command.

42. A method according to claim 40, wherein in determining whether the band process is to be executed, a time required to generate the image data of the second type of color element representation to be drawn in a band is driven, and wherein it is determined that the band process is not to be executed if the time derived exceeds a predetermined value.

43. A method according to claim 36, wherein the second type of color element representation comprises YMCK representation.

44. A method according to claim 36, wherein the first type of color element representation comprises RGB representation.

45. A color image processing device comprising:

a processor that converts input information into intermediate data of a first type of color element representation;

a rendering unit that generates image data of the first type of color element representation based on the intermediate data converted by said processor;

a first conversion unit that converts image data of the first type of color element representation into image data of the second type of color element representation; and a second conversion unit that converts image data of the second type of color element representation into image data of the first type of color element representation, wherein in applying a logic operation on image data of the first type of color element representation, said device is operable in a first mode in which the logic operation is applied directly to the image data of the first type of color element representation generated by said rendering unit, or in a second mode in which the logic operation is applied to the image data of the second type of color element representation converted by said first conversion unit and then the image data of the second type of color element representation to which the logic operation is applied is converted into the image data of the first type of color element representation by said second conversion unit.

46. A device according to claim 45, wherein said processor, in response to a logic drawing command included in the input information, decides which one of the first and second modes a logic drawing process is to be executed for the logic drawing command.

47. A device according to claim 46, wherein said processor determines which grade of a plurality of grades of image data is to be obtained from the input information by a rendering operation, the plurality of grades including a first grade and a second grade lower than the first grade, wherein said processor determines the second grade as the grade of image data to be obtained from the input information by the rendering operation when said processor decides that the logic drawing process is to be executed in the second mode for the logic drawing command.

48. A device according to claim 45, wherein the logic operation is executed with hardware in the first mode and with software in the second mode.

49. A device according to claim 45, wherein said processor determines whether a band process is to be executed.

50. An device according to claim 49, wherein said processor detects whether the input information includes a predetermined command for which a hardware rendering process cannot be applied, and wherein said processor determines that the band process is not to be executed when said processor detects that the input information includes the predetermined command.

51. A device according to claim 49, wherein said processor derives a time required for said rendering unit to generate the image data of the first type of color element representation based on the intermediate data to be drawn in a band, and wherein said processor determines that the band process is not to be executed if the time derived by said processor exceeds a predetermined value.

52. A device according to claim 45, wherein the first type of color element representation comprises YMCK representation.

53. A device according to claim 45, wherein the second type of color element representation comprises RGB representation.

54. A color image processing device which performs image data generation of one band and image data output of another band in parallel, said device comprising:
  a conversion unit that converts input information provided in a page description language of a first type of color element representation used in a higher-class apparatus into intermediate data used band by band, the intermediate data having a second type of color element representation used in a printer unit, the first and second types of color element representations being different from each other;
  an image data generator that generates, band by band, image data of the second type of color element representation based on the intermediate data converted by said conversion unit; and
  a print control unit that controls a banding process for one continued page in printing the image data generated by said image data generator,
  wherein said conversion unit not only converts the input information into the intermediate data, but also converts the first type of color element representation into the second type of color element representation.

55. A device according to claim 54, wherein said conversion unit retains the intermediate data sorted band by band and said image data generator generates the image data after said conversion unit has retained one page of the intermediate data.

56. A device according to claim 55, wherein said image data generator comprises a hard rendering unit.

57. A device according to claim 54, further comprising:
  a determining unit for determining whether said image data generator is to generate the image data of the second type of color element representation band by band;
  a second conversion unit for converting the intermediate data having the second type of color element representation reversely into intermediate data having the first type of color element representation, if said determining unit determines that said image data generator is not to generate the image data of the second type of color element representation; and
  a rendering unit for rendering the intermediate data having the first type of color element representation converted by said second conversion unit color element by color element.

58. A color image processing device comprising:
  a processing unit that generates, from input information provided in a page description language of a first type of color element representation used in a higher-class apparatus, image data of a second type of color element representation used in a printer unit;
  a first conversion unit that converts image data of the second type of color element representation into image data of the first type of color element representation; and
  a second conversion unit that converts image data of the first type of color element representation into image data of the second type of color element representation,
  wherein said device can be operated in a first mode in which the image data of the second type of color element representation generated by said processing unit is output to the printer unit, or in a second mode in which the image data generated by said processing unit is converted into the image data of the first type of color element representation by said first conversion unit and the image data of the first type of color element representation is converted into the image data of the second type of color element representation by said second conversion unit and then output to the printer unit.

59. A device according to claim 58, wherein said processing unit, in response to a logic drawing command included in the input information, decides in which one of the first and second modes a logic drawing process is to be executed for the logic drawing command.

60. A device according to claim 59, wherein said processing unit determines which grade of a plurality of grades of image data is to be obtained from the input information by a rendering operation, the plurality of grades including a first grade and a second grade lower than the first grade, wherein said processing unit determines the second grade as the grade of image data to be obtained from the input information by the rendering operation when said processing unit decides that the logic drawing process is to be executed in the second mode for the logic drawing command.

61. A device according to claim 59, wherein the logic operation is executed with software in the first mode and with hardware in the second mode.

62. A device according to claim 58, wherein said processing unit determines whether a band process is to be executed.

63. A device according to claim 62, wherein said processing unit detects whether the input information includes a predetermined command for which a hardware rendering process cannot be applied, and wherein said processing unit determines that the band process is not to be executed, if said processing unit detects that the input information includes the predetermined command.

64. A device according to claim 62, wherein said processing unit derives a time required for said processing unit to generate the image data of the second type of color element representation to be drawn in a band, and wherein said processing unit determines that the band process is not to be executed, if the time derived by said processing unit exceeds a predetermined value.

65. A device according to claim 58, wherein the second type of color element representation comprises YMCK representation.

66. A device according to claim 58, wherein the first type of color element representation comprises RGB representation.

* * * * *

UNITED STATES PATENT AND TRADEMARK OFFICE
CERTIFICATE OF CORRECTION

PATENT NO. : 6,490,055 B1
DATED : December 3, 2002
INVENTOR(S) : Shimizu

It is certified that error appears in the above-identified patent and that said Letters Patent is hereby corrected as shown below:

Column 7,
Line 3, "(full-p-lag)" should read -- (full-p-flag) --.
Line 51, "degrade)" should read -- degrade). --.

Column 8,
Line 2, "above described," should read -- described above, --.

Column 14,
Line 56, "Accordingly,in" should read -- Accordingly, in --.

Column 21,
Line 39, "claim 32," should read -- claim 32, further --.

Column 23,
Line 27, "An" should read -- A --.

Signed and Sealed this

Fifth Day of August, 2003

JAMES E. ROGAN
*Director of the United States Patent and Trademark Office*